United States Patent
Tang

(10) Patent No.: US 10,822,062 B2
(45) Date of Patent: Nov. 3, 2020

(54) VIOLENT MOTIONS AND CAPSIZING WARNING SYSTEM FOR OCEANGOING VESSELS

(71) Applicant: Shaojie Tang, Sugar Land, TX (US)

(72) Inventor: Shaojie Tang, Sugar Land, TX (US)

( * ) Notice: Subject to any disclaimer, the term of this patent is extended or adjusted under 35 U.S.C. 154(b) by 209 days.

(21) Appl. No.: 16/159,569

(22) Filed: Oct. 12, 2018

(65) Prior Publication Data

US 2020/0115013 A1    Apr. 16, 2020

(51) Int. Cl.
*B63B 43/00* (2006.01)
*B63B 43/02* (2006.01)
*G05D 1/08* (2006.01)

(52) U.S. Cl.
CPC .......... *B63B 43/02* (2013.01); *G05D 1/0875* (2013.01)

(58) Field of Classification Search
None
See application file for complete search history.

(56) References Cited

U.S. PATENT DOCUMENTS

| 2010/0147204 A1* | 6/2010 | O'Brien ................ B63B 39/06 114/122 |
| 2015/0134293 A1* | 5/2015 | Watanabe ............ G01C 21/00 702/151 |

FOREIGN PATENT DOCUMENTS

WO    WO-2018233025 A1 *  12/2018  ............. B63B 39/14

OTHER PUBLICATIONS

Article titled "Nonlinear Dynamics of Ship Oscillations" by Kreuzer et al. and published in 2000.*
Sname, Nomenclature for treating the motion of a submerged body through a fluid, Technical and Research Bulletin No. 1-5, 1950.
Crudu L et al, Ship stability in following waves: theoretical and experimental investigations, 5th Intl Conf on Stability of Ships and Ocean Vehicles; Nov. 7-11, 1994.
Pauling J R et al, Experimental studies of capsizing of intact ships in heavy seas, Technical Report AD-753653, University of California, Berkeley, 1972.

* cited by examiner

*Primary Examiner* — Blake A Tankersley

(57) ABSTRACT

A system and a method to warn a ship crew of potential violent motions in the immediate near future for the oceangoing vessel when operating in seas. Violent ship motions not only discomfort ship crews, damage cargos and ship structures, but also pose potential capsizing risk to ships. The system includes motion sensors; computer hardware and software; and warning devices. The sensors measure the ship roll, pitch, yaw, and rudder motions. The time histories of these motions are stored in the hardware and constantly analyzed using Finite Fourier Transform by Fast Fourier Transform (FFT) to detect the nonlinear inertial coupling effect which is newly discovered by the inventor and believed to be the root cause leading to violent motions and capsizing. Based on the inventor's theory of nonlinear instability and inertial coupling effect, the invented method detects nonlinear yaw instability potential and inertial coupling events, and provides warnings to master to reduce potential yaw nonlinear instability, to avoid inertial coupling roll response, rudder induced oscillations, and broaching, and to prevent capsize in seas.

7 Claims, 15 Drawing Sheets

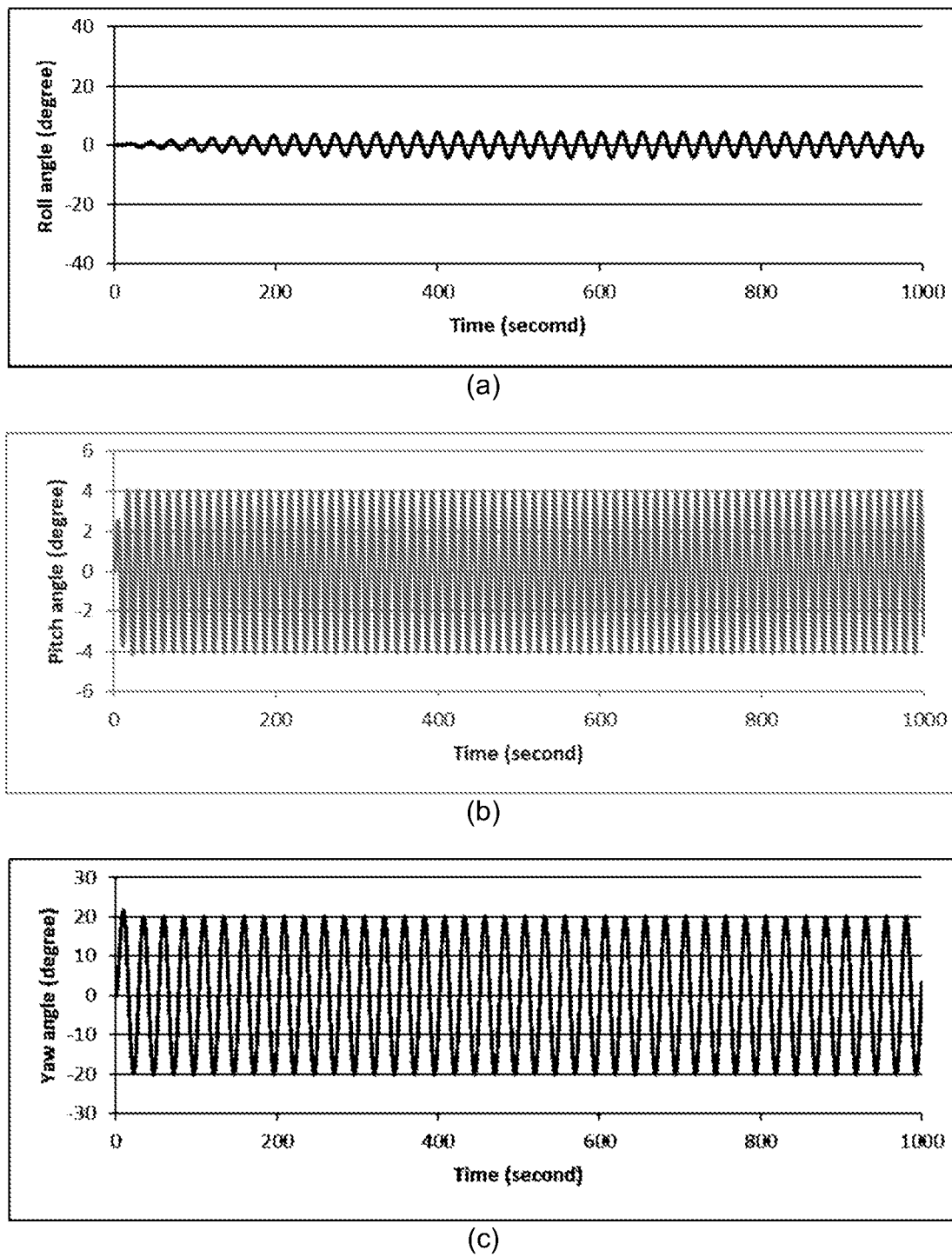
*Fig. 10* The ship motion solutions with the linearization assumption.

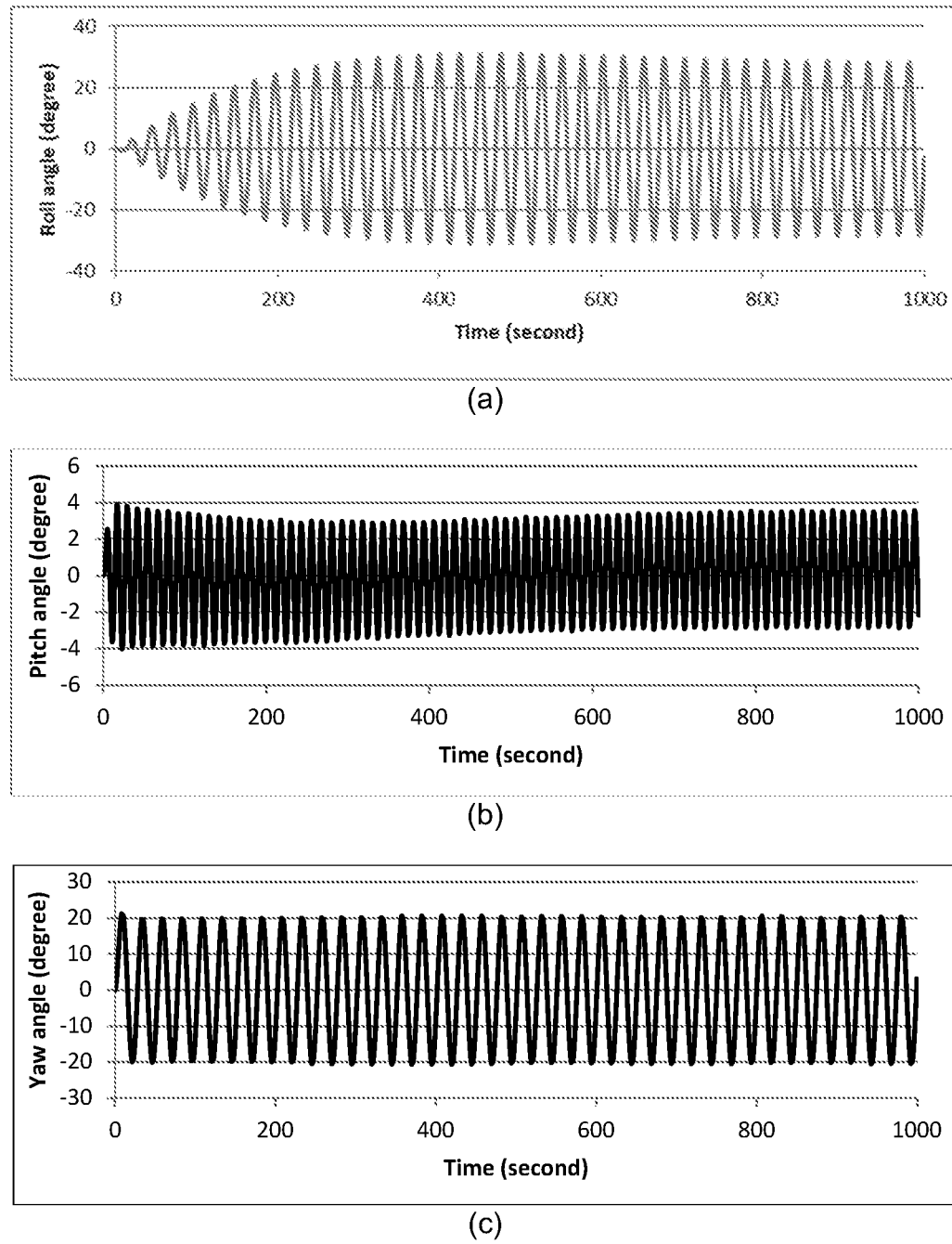
*Fig. 11* The ship motion solutions without the linearization assumption.

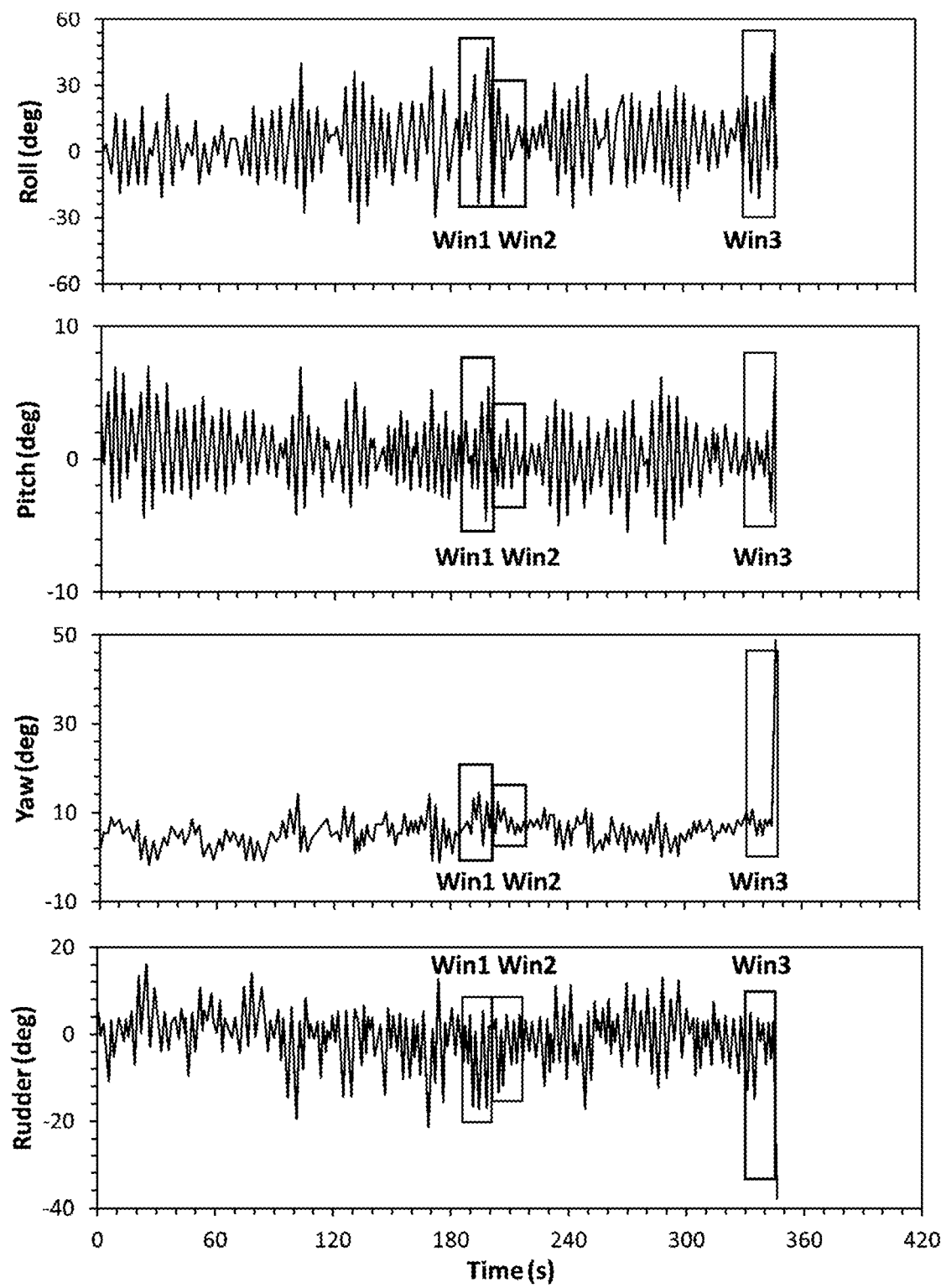
*Fig. 12* Ship motion time histories. Th ship capsized at 348.4 seconds.

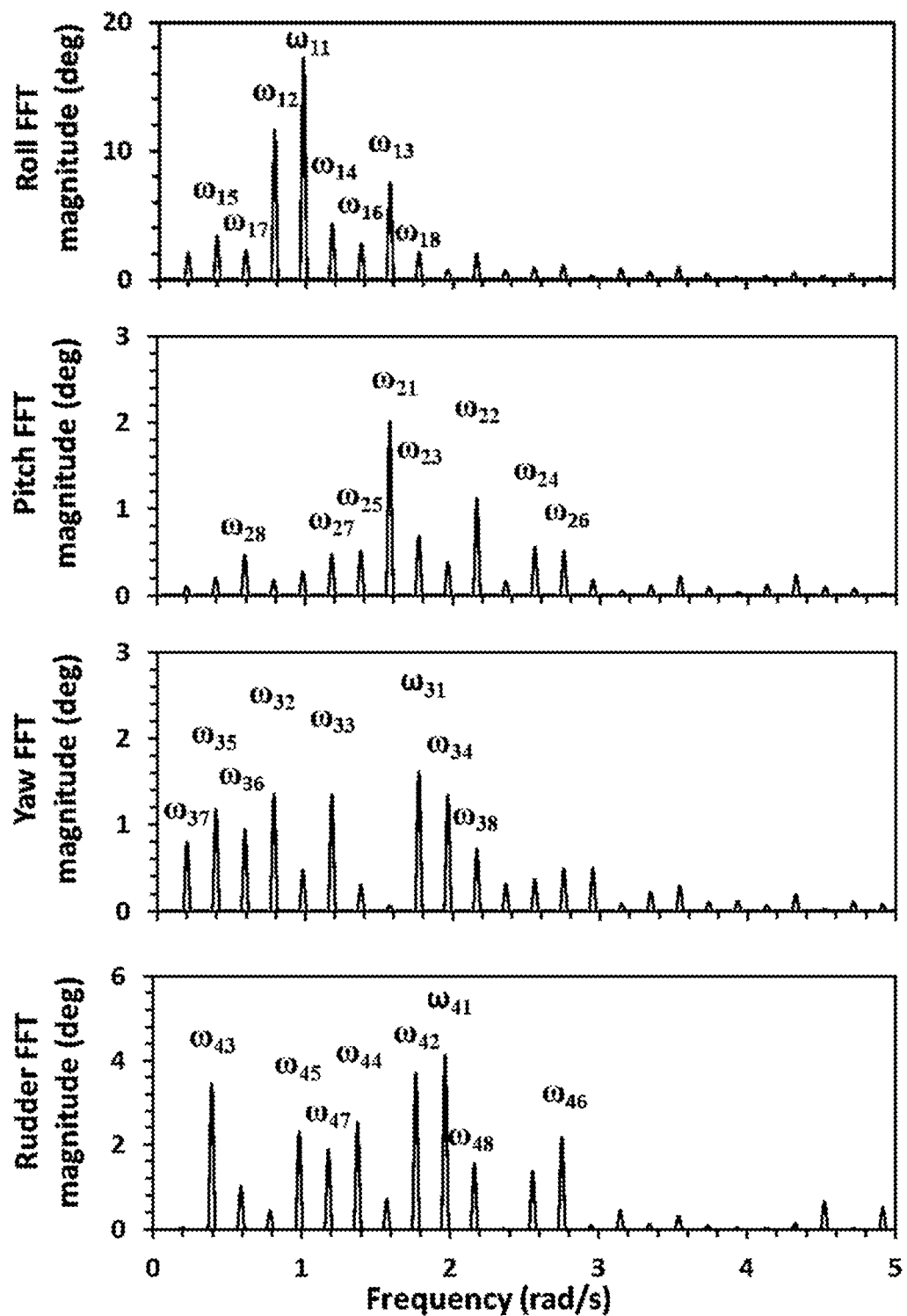
*Fig. 13* The FFT frequencies and magnitudes of motions in Win1 of *Fig. 12*.

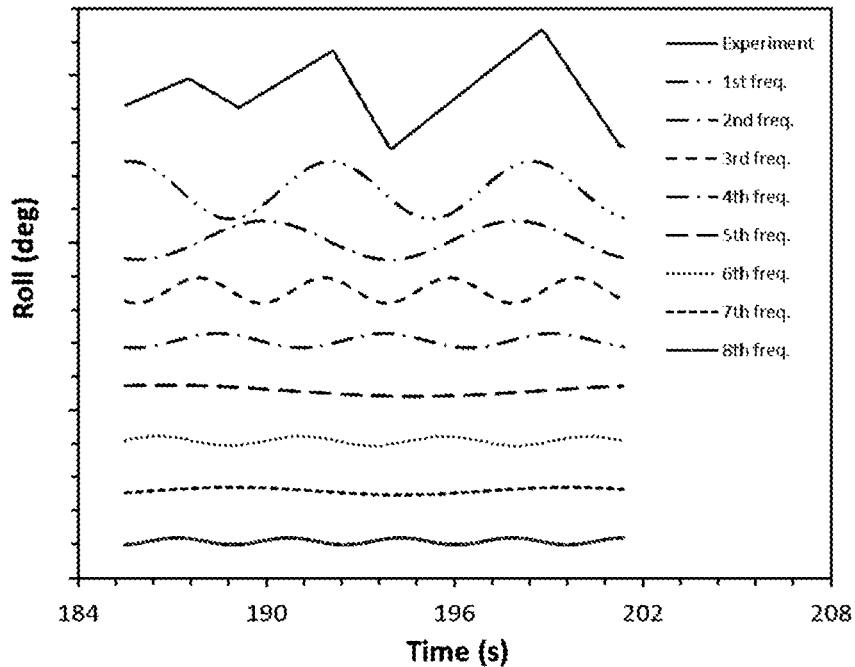
*Fig. 14A* The time histories and the FFT components of Roll in Win1 of *Fig. 12*.
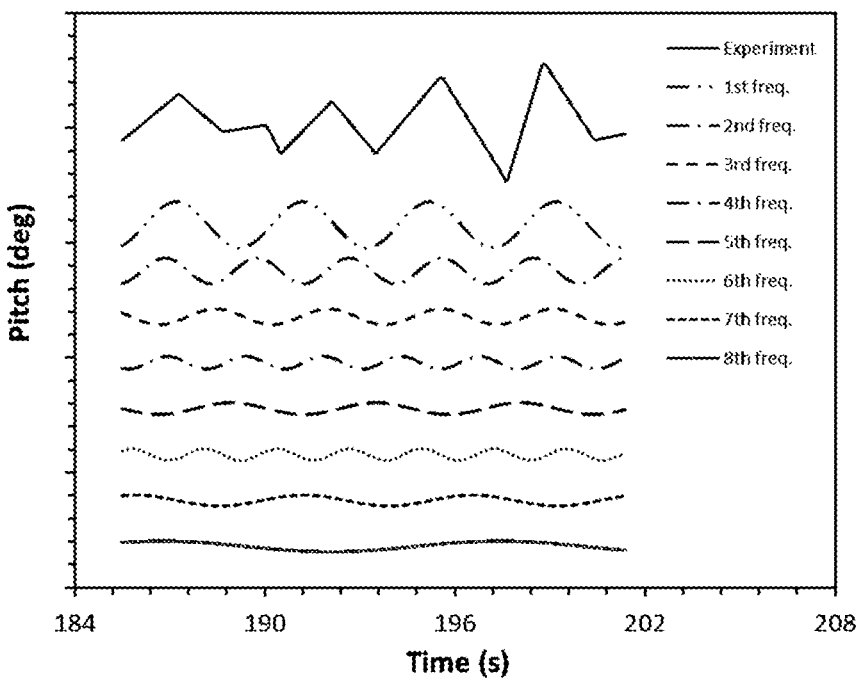
*Fig. 14B* The time histories and the FFT components of Pitch in Win1 of *Fig. 12*.

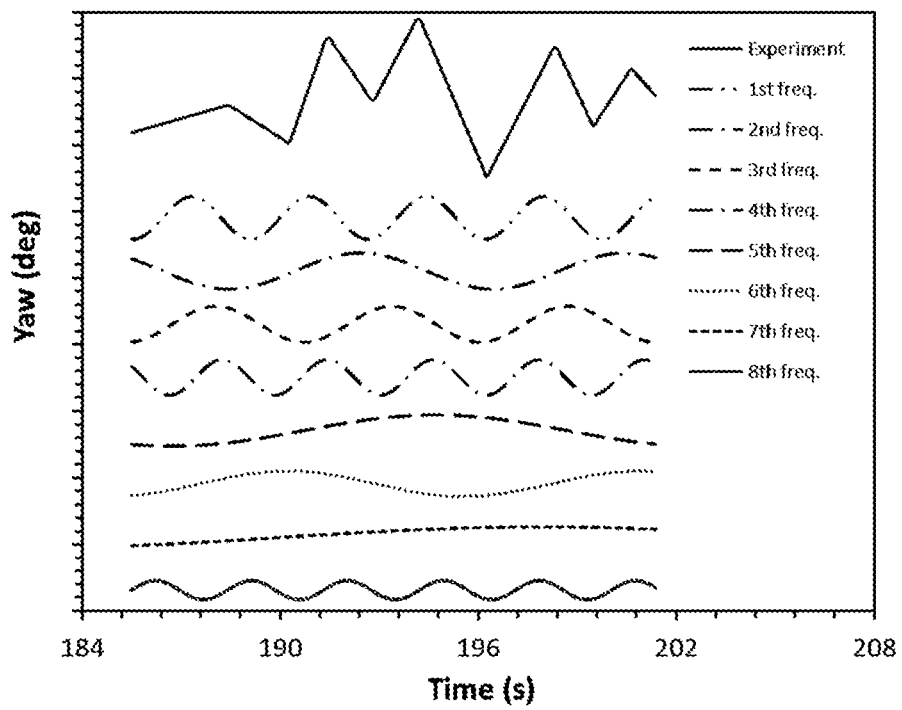
*Fig. 14C* The time histories and the FFT components of Yaw in Win1 of *Fig. 12*.
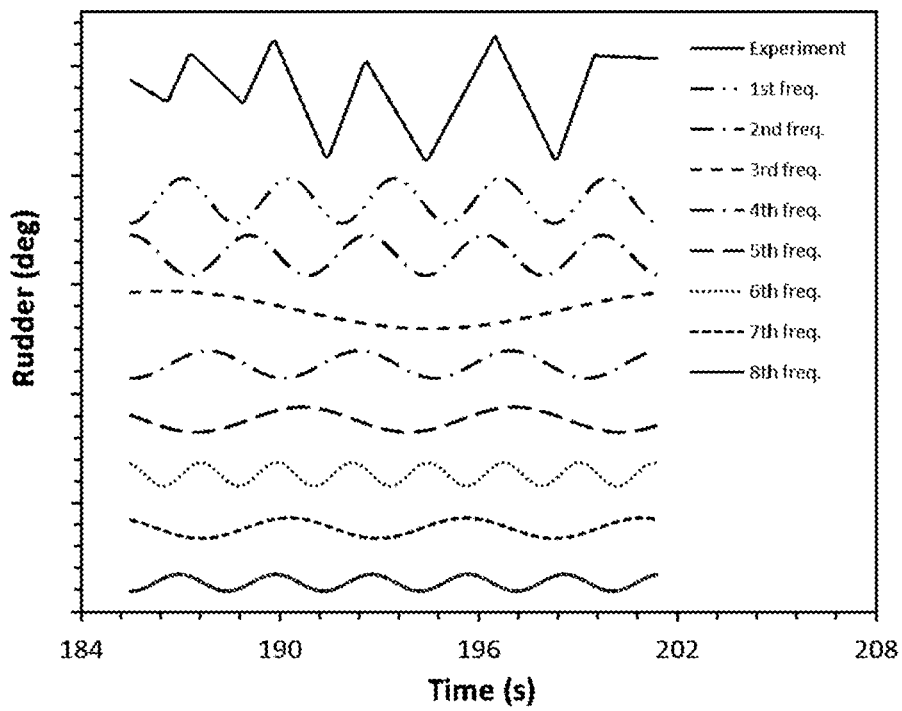
*Fig. 14D* The time histories and the FFT components of Rudder in Win1 of *Fig. 12*.

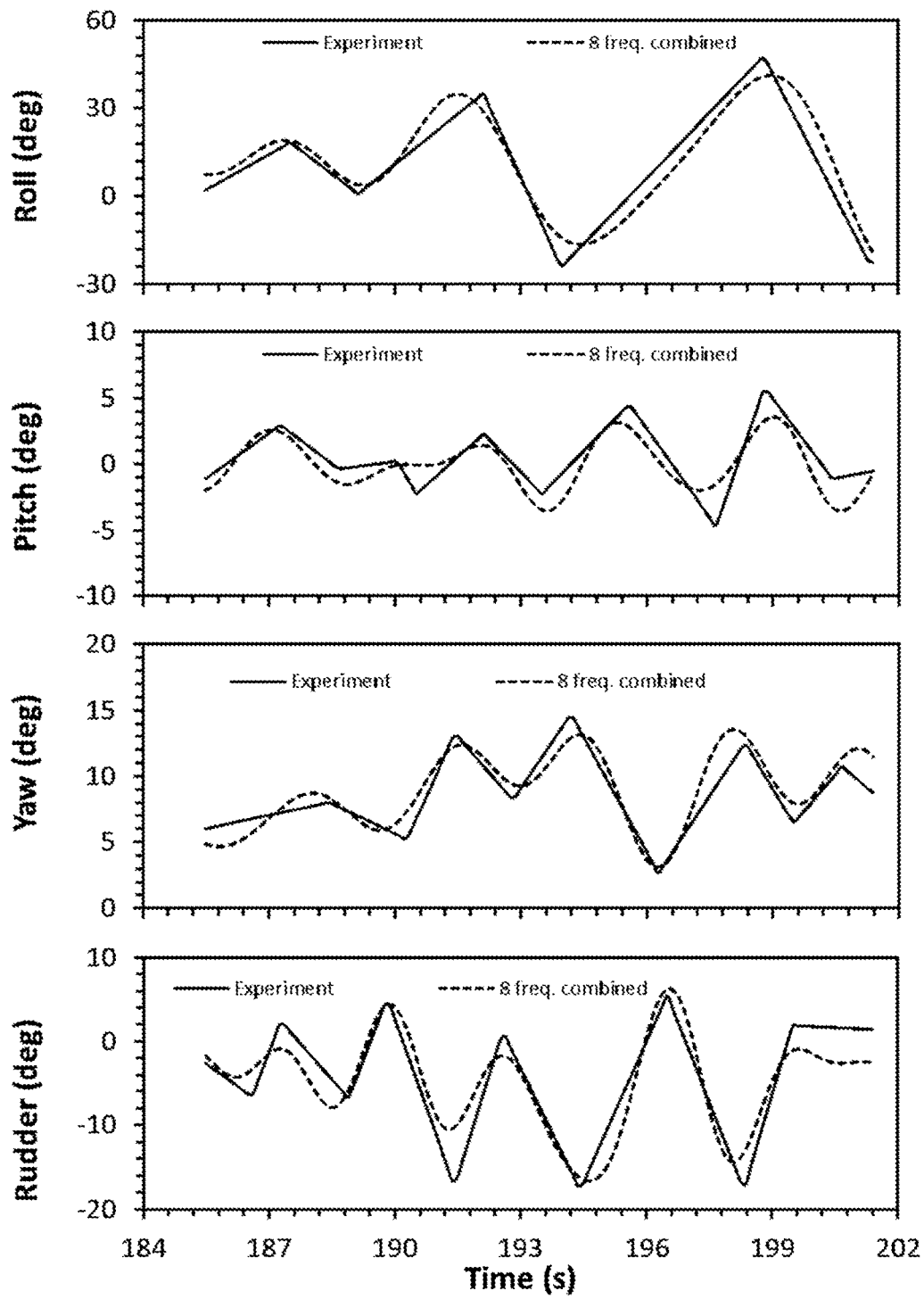
*Fig. 15* The time histories and the Fourier approximations of motions in Win1 of *Fig. 12*.

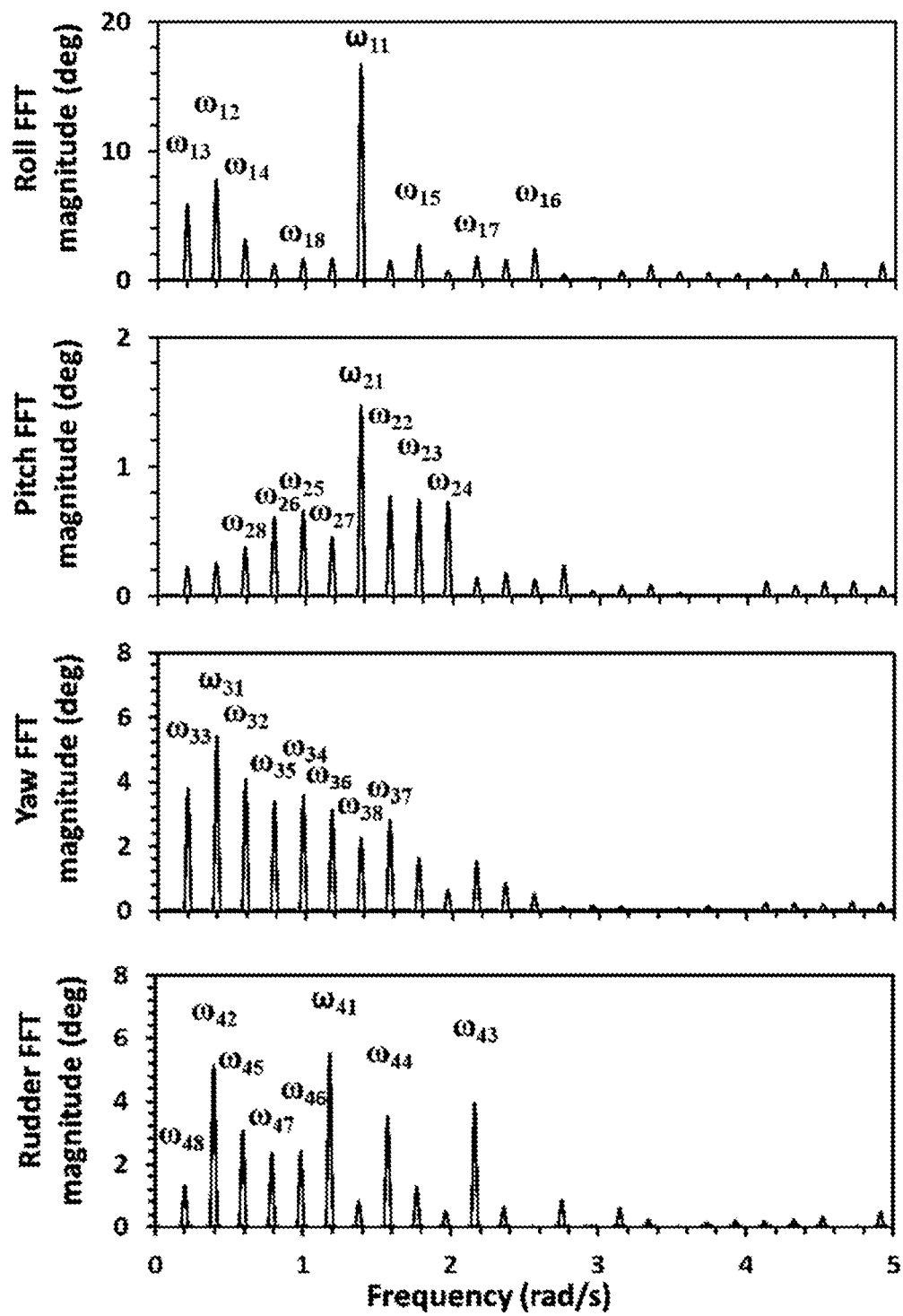
*Fig. 16* The FFT frequencies and magnitudes of motions in Win3 of *Fig. 12*.

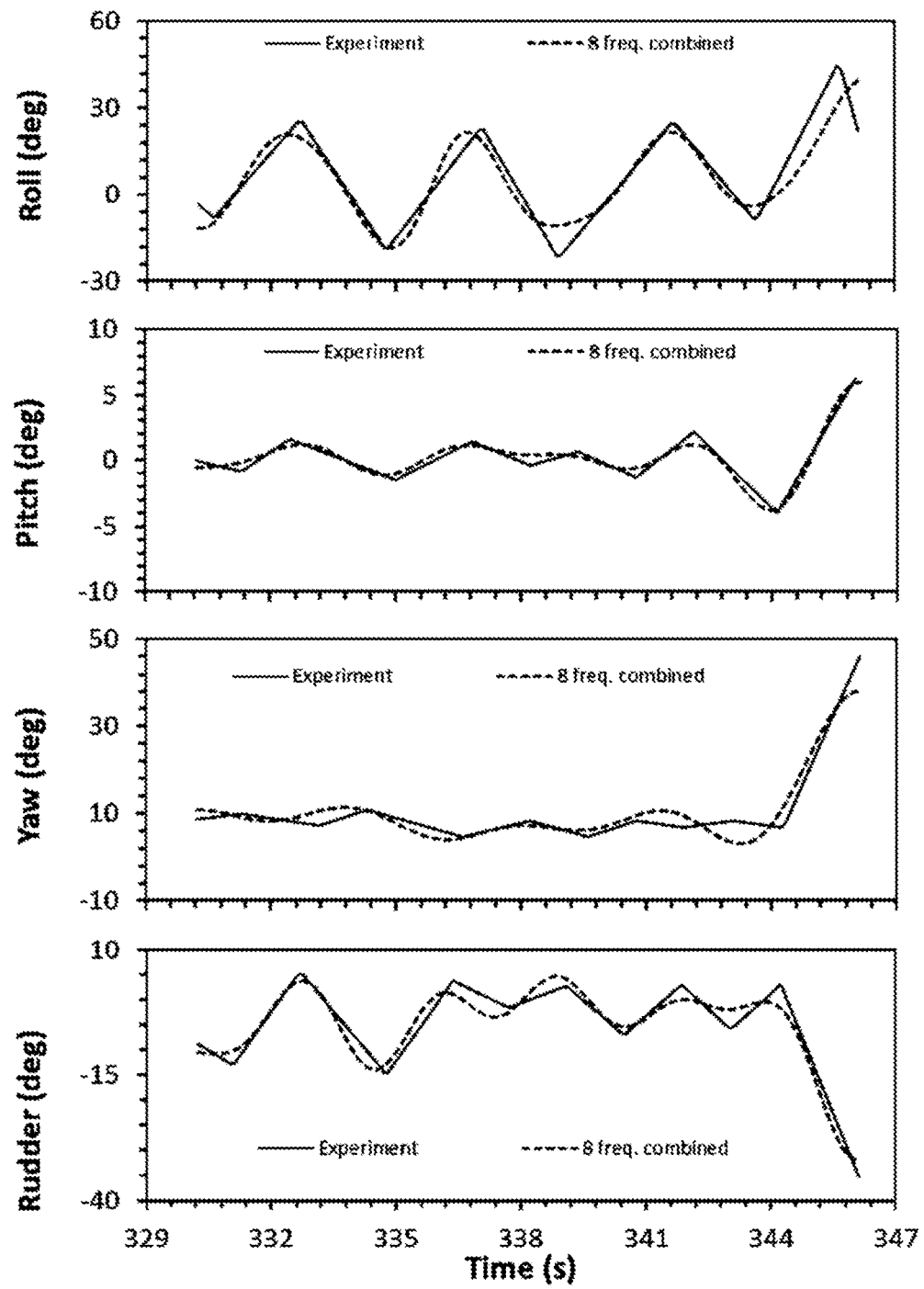
*Fig. 17* The time histories and the Fourier approximations of motions in Win3 of *Fig. 12*.

|  | Roll |  | Pitch |  | Yaw |  | Rudder |  |
|---|---|---|---|---|---|---|---|---|
| 1st freq. | $\omega_{11}$ | 1.38 | $\omega_{21}$ | 1.38 | $\omega_{31}$ | 0.39 | $\omega_{41}$ | 1.18 |
|  | $A_{11}$ | 16.69 | $A_{21}$ | 1.47 | $A_{31}$ | 5.41 | $A_{41}$ | 5.54 |
| 2nd freq. | $\omega_{12}$ | 0.39 | $\omega_{22}$ | 1.57 | $\omega_{32}$ | 0.59 | $\omega_{42}$ | 0.39 |
|  | $A_{12}$ | 7.81 | $A_{22}$ | 0.77 | $A_{32}$ | 4.07 | $A_{42}$ | 5.17 |
| 3rd freq. | $\omega_{13}$ | 0.20 | $\omega_{23}$ | 1.77 | $\omega_{33}$ | 0.20 | $\omega_{43}$ | 2.16 |
|  | $A_{13}$ | 5.89 | $A_{23}$ | 0.75 | $A_{33}$ | 3.81 | $A_{43}$ | 3.95 |
| 4th freq. | $\omega_{14}$ | 0.59 | $\omega_{24}$ | 1.96 | $\omega_{34}$ | 0.98 | $\omega_{44}$ | 1.57 |
|  | $A_{14}$ | 3.13 | $A_{24}$ | 0.73 | $A_{34}$ | 3.58 | $A_{44}$ | 3.54 |
| 5th freq. | $\omega_{15}$ | 1.77 | $\omega_{25}$ | 0.98 | $\omega_{35}$ | 0.79 | $\omega_{45}$ | 0.59 |
|  | $A_{15}$ | 2.68 | $A_{25}$ | 0.66 | $A_{35}$ | 3.40 | $A_{45}$ | 3.07 |
| 6th freq. | $\omega_{16}$ | 2.55 | $\omega_{26}$ | 0.79 | $\omega_{36}$ | 1.18 | $\omega_{46}$ | 0.98 |
|  | $A_{16}$ | 2.35 | $A_{26}$ | 0.61 | $A_{36}$ | 3.11 | $A_{46}$ | 2.43 |
| 7th freq. | $\omega_{17}$ | 2.16 | $\omega_{27}$ | 1.18 | $\omega_{37}$ | 1.57 | $\omega_{47}$ | 0.79 |
|  | $A_{17}$ | 1.73 | $A_{27}$ | 0.45 | $A_{37}$ | 2.82 | $A_{47}$ | 2.37 |
| 8th freq. | $\omega_{18}$ | 0.98 | $\omega_{28}$ | 0.59 | $\omega_{38}$ | 1.38 | $\omega_{48}$ | 0.20 |
|  | $A_{18}$ | 1.58 | $A_{28}$ | 0.37 | $A_{38}$ | 2.24 | $A_{48}$ | 1.34 |

The frequency $\omega_{nn}$ in rad/s and the amplitude $A_{nn}$ in deg.

*Fig. 18* The frequencies and amplitudes of the largest eight Fourier components of motions in Win3 of *Fig. 12*.

VIOLENT MOTIONS AND CAPSIZING WARNING SYSTEM FOR OCEANGOING VESSELS

FIELD

The invention is generally related to violent motions and capsize avoidance for oceangoing vessels, more specifically, to systems for providing a warning for oceangoing vessels for the so-called inertial coupling effects which is believed to be the root cause for violent ship motions and capsizing.

BACKGROUND

Ship capsizing happens occasionally even nowadays. In 2014, Ro/Ro ferry, MV Sewol capsized due to "unreasonable sudden turn" with 304 people died according to Wikipedia. In 2015, cargo ship, EL FARO capsized with 33 people on board missing due to hurricane (Wikipedia). Despite long history of shipping industry, evidences indicate that ship broaching and capsizing in seas have not been understood satisfactorily. Why in following or quartering seas, wave crest amidships is dangerous; why when pitch frequency is close to roll frequency, sudden yaw (or turn) could happen and heading control could lose; why in perfect following seas, indicating no wave exciting roll moment, ship could have a large roll and even capsize; and why the wave exciting moments by linearization theory could not explain ship capsize. All those questions have not been answered satisfactorily. The reason for this situation is that a fundamental mistake has been made in dealing with the ship dynamics in naval architecture industry.

For a ship, the governing equations for its rotational motions (roll, pitch, and yaw) are given by Math. 1 in the vector form. They were obtained based on Newton's second law of motion in a body-fixed reference frame, see the reference, SNAME: "Nomenclature for treating the motion of a submerged body through a fluid", Technical and Research Bulletin No. 1-5 (1950);

$$d\vec{H}/dt = -\vec{\omega} \times \vec{H} + \vec{M} \qquad \text{Math. 1}$$

wherein $\vec{\omega}=(p,q,r)=(\dot{\varphi},\dot{\theta},\dot{\psi})$: the angular velocities of the ship; $\varphi,\theta,\psi$: the roll, pitch, and yaw angle about the principal axes of inertia X, Y, Z, respectively; $\vec{H}=(I_x p, I_y q, I_z r)$: the angular momentum of the ship; $I_x, I_y, I_z$: the moment of inertias about the principal axes of inertia X, Y, Z, respectively (These parameters are constants in this frame); $\vec{M}=(M_x, M_y, M_z)$: the external moments acting on the ship about the principal axes of inertia. In both the naval architecture academy and industry, the current practice to deal with Math. 1 is to make a linearization approximation first and then solve the equations because the nonlinear term $-\vec{\omega} \times \vec{H}$ is too difficult to deal with. The linearization approximation makes the nonlinear term $-\vec{\omega} \times \vec{H}$ disappear, and the equations become $$d\vec{H}/dt = \vec{M}. \qquad \text{Math. 2}$$

However, the equations are still considered in the body-fixed reference frame which is a non-inertial frame. The reason for this is that the external moments $(M_x, M_y, M_z)$ acting on ships and the moments of inertia are needed to be considered in the body-fixed reference frame.

The fundamental mistake is that the nonlinear term $-\vec{\omega} \times \vec{H}$ cannot be neglected because they are the inertial moments tied to the non-inertial reference frame which is the body-fixed reference frame in this case. This mistake is similarly like we neglect the Coriolis force which equals $-2\vec{\Omega} \times \vec{V}$, where $\vec{\Omega}$ is the angular velocity vector of the earth and V is the velocity vector of a moving body on earth. Then we try to explain the swirling water draining phenomenon in a bathtub. In this case, we are considering the water moving in the body-fixed and non-inertial reference frame which is the earth. The Coriolis force is an inertial force generated by the rotating earth on the moving objects which are the water particles in this case. Without the Coriolis force, we cannot explain the motions of the swirling water. Similarly, in the aircraft dynamics, the aircraft is rotating, and we consider the rotational motions of the aircraft in the body-fixed and non-inertial reference frame which is the aircraft itself. The difference between the two cases is that in the former the object (water particle) has translational motions (V) while in the latter the object (aircraft itself) has rotational motions ($\vec{\omega}$) but they both have the important inertial effects which cannot be neglected because both the objects are considered in the non-inertial reference frames. In the former the inertial effect is the Coriolis force $-2\vec{\Omega} \times \vec{V}$ while in the latter the inertial effect is the inertial moment $-\vec{\omega} \times \vec{H}$ which are not forces but moments since we are dealing with rational motions instead of translational one. Without the inertial moment, we cannot explain many phenomena which happened to ship such as broaching and capsizing in following and quartering seas.

In the inventor's book: "Nonlinear Instability and Inertial Coupling Effect—The Root Causes Leading to Aircraft Crashes, Land Vehicle rollovers, and Ship Capsizes" (ISBN 9781732632301 to be published in November 2018 by Faiteve Inc), the equations Math. 1 have been solved analytically without the linearization approximation. It was found that the inertial coupling terms $-\vec{\omega} \times \vec{H}$ can significantly change the roll motion. A summary of the findings is given below. The governing equations of rotational motions of a ship in following or quartering seas can be written in the scalar form as $$(I_x+a_1)\ddot{\varphi}+b_1\dot{\varphi}+k_1\varphi=(I_y-I_z)\dot{\theta}\dot{\psi}+M_{11}\cos(\omega_{11}t+\alpha_{11}), \qquad \text{Math. 3}$$

$$(I_y+a_2)\ddot{\theta}+b_2\dot{\theta}+k_2\theta=(I_z-I_x)\dot{\varphi}\dot{\psi}+M_{21}\cos(\omega_{21}t+\alpha_{21}), \qquad \text{Math. 4}$$

$$(I_z+a_3)\ddot{\psi}+b_3\dot{\psi}=(I_x-I_y)\dot{\varphi}\dot{\theta}+M_{31}\cos(\omega_{31}t+\alpha_{31}), \qquad \text{Math. 5}$$

wherein $a_1, a_2, a_3$ are the added mass for roll, pitch, and yaw, respectively; $b_1, b_2, b_3$ are the damping coefficients for roll, pitch, and yaw, respectively; $k_1$ and $k_2$ are the restoring coefficients for roll and pitch, respectively; $M_{11}, M_{21}, M_{31}$ are the wave moment amplitude for roll, pitch, and yaw, respectively; $\omega_{11}, \omega_{21}, \omega_{31}$ and $\alpha_{11}, \alpha_{21}, \alpha_{31}$ are the frequency and phase of the wave moment for roll, pitch, and yaw, respectively. These equations represent a dynamic system governing the rotational dynamics of the ship in seas. According to the current practice in the industry under the linearization approximation, these equations become $$(I_x+a_1)\ddot{\varphi}+b_1\dot{\varphi}+k_1\varphi=M_{11}\cos(\omega_{11}t+\alpha_{11}), \qquad \text{Math. 6}$$

$$(I_y+a_2)\ddot{\theta}+b_2\dot{\theta}+k_2\theta=M_{21}\cos(\omega_{21}t+\alpha_{21}), \qquad \text{Math. 7}$$

$$(I_z+a_3)\ddot{\psi}+b_3\dot{\psi}=M_{31}\cos(\omega_{31}t+\alpha_{31}). \qquad \text{Math. 8}$$

Therefore, the current practice says that the ship's roll, pitch, and yaw motions are not coupled. In fact, however, these motions are coupled as described by Math. 3, Math. 4 and Math. 5. To demonstrate the difference, we have performed numerical experiments for the two systems, one is represented by Math. 6, Math. 7, and Math. 8 which are under the linearization assumption, and another by Math. 3, Math. 4, and Math. 5 which are nonlinear equations without the linearization assumption. The two systems have identical wave exciting moments including identical amplitudes, frequencies, and phases. FIG. 10 shows the time histories of roll, pitch, and yaw for the linearized system while FIG. 11 shows the results of the fully nonlinear system. As can be seen, the linearized system predicted the roll of only 4 degrees while the nonlinear system predicted 28 degrees of roll under the identical wave moments. The difference is caused by the nonlinear terms $-\vec{\omega}\lambda\vec{H}$ in Math. 3, Math. 4, and Math. 5. The linearization theory assumes that these nonlinear terms are small so that they can be neglected. The fact is that this assumption is not always valid. The reason is explained below. The roll dynamic system of the ship is a harmonic oscillation system as shown in Math. 3. As we know for a harmonic system, a resonance phenomenon can be excited by a driving force (or moment), no matter how small it is, as long as its frequency matches the natural frequency of the system. Let us explore this in detail by describing the motions in Fourier series as:

$$\varphi = \Sigma_{i=1}^{N} A_{1i} \cos(\omega_{1i} t + \beta_{1i} + \varphi_0), \quad \text{Math. 9}$$

$$\theta = \Sigma_{j=1}^{N} A_{2j} \cos(\omega_{2j} t + \beta_{2j} + \theta_0), \quad \text{Math. 10}$$

$$\psi = \Sigma_{l=1}^{N} A_{3l} \cos(\omega_{3l} t + \beta_{3l} + \psi_0), \quad \text{Math. 11}$$

wherein N is the total number of terms of the three Fourier series, respectively; i is the index number for the roll's Fourier series; $A_{1i}$ is the amplitude of the ith mode of the roll's Fourier series; $\omega_{1i}$ and $\beta_{1i}$ are the frequency and the phase of the ith mode of the roll's Fourier series, respectively; $\Phi_0$ is the average value of roll; j is the index number for the pitch's Fourier series; $A_{2j}$ is the amplitude of the jth mode of the pitch's Fourier series; $\omega_{2j}$ and $\beta_{2j}$ are the frequency and the phase of the jth mode of the pitch's Fourier series, respectively; $\theta_0$ is the average value of pitch; l is the index number for the yaw's Fourier series; $A_{3l}$ is the amplitude of the lth mode of the yaw's Fourier series; $\omega_{3l}$ and $\beta_{3l}$ are the frequency and the phase of the lth mode of the yaw's Fourier series, respectively; $\psi_0$ is the average value of yaw.

Then the roll governing equation Math. 3 can be written as $$(I_x + a_1)\ddot{\varphi} + b_1\dot{\varphi} + k_1\varphi = (I_z - I_y)$$
$$\Sigma_{j=1}^{N}\Sigma_{l=1}^{N} \tfrac{1}{2} A_{2j}\omega_{2j}A_{3l}\omega_{3l}\{\cos[(\omega_{2j}+\omega_{3l})t+\beta_{2j}+\beta_{3l}] - \cos[(\omega_{2j}-\omega_{3l})t+\beta_{2j}-\beta_{3l}]\} + M_{11}\cos(\omega_{11}t+\alpha_{11}). \quad \text{Math. 12}$$

Note that this is a harmonic oscillation system with one wave moment and 2×N×N inertial coupling moments. The roll response amplitudes due to the inertial coupling moments can be derived as:

$$\frac{\frac{I_z - I_y}{2I'_x} A_{2j}\omega_{2j}A_{3l}\omega_{3l}}{\sqrt{[(\omega_{2j}+\omega_{3l})^2 - \omega_{10}^2]^2 + [b'_1(\omega_{2j}+\omega_{3l})]^2}}, \quad \text{Math. 13}$$

$$j = 1, 2, \ldots N; l = 1, 2, \ldots N;$$

$$\frac{\frac{I_z - I_y}{2I'_x} A_{2j}\omega_{2j}A_{3l}\omega_{3l}}{\sqrt{[(\omega_{2j}-\omega_{3l})^2 - \omega_{10}^2]^2 + [b'_1(\omega_{2j}-\omega_{3l})]^2}}, \quad \text{Math. 14}$$

$$j = 1, 2, \ldots N; l = 1, 2, \ldots N;$$

wherein $I'_x = I_x + a_1$, $b'_1 = b_1/(I_x + a_1)$, and the roll natural frequency $\omega_{10} = \sqrt{k_1/I'_x}$. As can be seen if any of the frequencies $\omega_{2j} + \omega_{3l}$ or $\omega_{2j} - \omega_{3l}$ matches the roll natural frequency $\omega_{10}$, the roll resonance will happen. Similarly, yaw responses can be also obtained as $$\frac{\frac{I_y - I_x}{2I'_z} A_{1i}\omega_{1i}A_{2j}\omega_{2j}}{(\omega_{1i}+\omega_{2j})\sqrt{(\omega_{1i}+\omega_{2j})^2 + b'^2_3}}, \quad \text{Math. 15}$$

$$i = 1, 2, \ldots N; j = 1, 2, \ldots N;$$

$$\frac{\frac{I_y - I_x}{2I'_z} A_{1i}\omega_{1i}A_{2j}\omega_{2j}}{(\omega_{1i}-\omega_{2j})\sqrt{(\omega_{1i}-\omega_{2j})^2 + b'^2_3}}, \quad \text{Math. 16}$$

$$i = 1, 2, \ldots N; j = 1, 2, \ldots N;$$

wherein $I'_z = I_z + a_3$, $b'_3 = b_3/(I_z + a_3)$. As can be seen, if the pitch frequency $\omega_{2j}$ coincides with the roll frequency $\omega_{1i}$, the yaw amplitude given in Math. 16 will go to infinity. This is the broaching mechanism which happened when the pitch frequency matches the roll frequency especially when the roll frequency is at the roll natural frequency, i.e. $\omega_{21} = \omega_{11} = \omega_{10}$. In this case, $\omega_{31} = \omega_{21} - \omega_{11} = 0$. This is a very dangerous situation in which, on one hand, the roll encounters a resonance and on the other hand, the yaw experiences a very large amplitude oscillation, and then the ship will lose heading control and is prone to capsize.

In the inventor's book, a nonlinear instability phenomenon was also discovered. The nonlinear instability is always attached with the rotational direction where the moment of inertia is the intermediate between the other two inertias. For oceangoing ships, if the loading condition makes the pitch moment of inertia to be larger than the yaw inertia, i.e. $I_x < I_z < I_y$, the ship may expose to a risk of the nonlinear yaw instability. This kind of loading condition is a realistic loading condition for some cargo ships and could cause violent rolling in seas. For example, Crudu L. etc., "Ship stability in following waves: theoretical and experimental investigations", Fifth international conference on stability of ships and ocean vehicles, November 1994. The nonlinear instability states that if a ship has only yaw oscillation and the yaw amplitude $A_{yaw}$ (or yaw angular velocity amplitude $A_{yaw}\omega_{31}$) exceeds the yaw threshold $A_{YTH}$ (or the yaw angular velocity threshold $r_{YTH}$) described below, the yaw oscillation alone becomes unstable so that the roll and pitch motions could grow from almost zero, especially the roll could grow to very large.

$$A_{YTH} = \frac{2}{\omega_{31}} \sqrt{\frac{I'_x I'_y Z_{11} Z_{21}}{(I_y - I_z)(I_z - I_x)}}, \quad \text{Math. 17a}$$

$$r_{YTH} = A_{YTH}\omega_{31} = 2\sqrt{\frac{I'_x I'_y Z_{11} Z_{21}}{(I_y - I_z)(I_z - I_x)}}, \quad \text{Math. 17b}$$

wherein $\omega_{31}=|\omega_{11}-\omega_{21}|$ is the yaw frequency; $I'_x=I_x+a_1$; $I'_y=I_y+a_2$; $Z_{11}=\sqrt{(\omega_{11}^2-\omega_{10}^2)^2+(b'_1\omega_{11})^2}/\omega_{11}$; $Z_{21}=\sqrt{(\omega_{21}^2-\omega_{20}^2+(b'_2\omega_{21})^2)}/\omega_{21}$. Note that Math. 17b is based on the same formula Math. 17a, but described in terms of the angular velocity threshold.

In general, oceangoing ships have the relationship among the moments of inertia as $I_x<I_y<I_z$ with $I_y$ very close to $I_z$. That is why $I_y$ and $I_z$ are always assumed to be the same if they are not known. This conclusion applies to ships having a flat box transverse cross section, i.e. ship structure height is less than beam, like oil tankers and bulk carriers. However, for some type of ships $I_x<I_y<I_z$ is not true, but $I_x<I_z<I_y$ may be true because those ships have tall transverse cross section instead of a flat transverse cross section. The larger vertical distance will increase the pitch moment of inertia since $I_y=\Sigma_i m_i(x_i^2+z_i^2)$ and $I_z=\Sigma_i m_i(x_i^2+y_i^2)$. As can be seen, when $z_i$ of a mass is increased, the effect of increasing in $I_y$ is nonlinear and in a power of 2. Ro/Ro ships (or ferry) may belong to this category. For Ro/Ro ships, both the structure mass and the loaded mass are stretched in vertical direction (z direction), meaning that $z_i$ is increased but $y_i$ keeps the same. For example, Ro/Ro Ferry MV Sewol had a beam of 22 m but the roof of the $5^{th}$ floor was about 28 m from the baseline. This kind of design may make the pitch moment of inertia of a Ro/Ro ship being larger than its yaw moment of inertia. As a result, the ship may expose to yaw instability as described in Math. 17a and Math. 17b.

The above nonlinear instability and inertial coupling effects have been discovered by the inventor just recently. Therefore, there is a need to have a system and a method to warn a ship crew of potential violent motions in the immediate near future for the oceangoing vessel when operating in seas.

SUMMARY

This invention is designed to provide the ship crew with situational awareness of potential violent motions in the immediate near future for the oceangoing vessel when operating in seas. It provides alarming signals to warn the crew if potential dangerous situations detected, such as potential yaw nonlinear instability, potential broaching, inertial roll response exceeding, and rudder induced oscillation.

In one embodiment, a method is presented for identifying yaw nonlinear instability by comparing the moments of inertias for roll, pitch, and yaw.

In another embodiment, a calibration procedure is presented for identifying the inertial coupling roll response coefficient threshold by using Finite Fourier Transform (FFT) analyses for the most recent roll, pitch, and yaw time histories.

In yet another embodiment, a method is presented for identifying potential broaching situation by comparing the first roll frequency and the first pitch frequency obtained in the FFT analyses.

In still yet another embodiment, a method is presented for detecting potential violent roll motions in the immediate near future when a ship operating in seas.

In further still yet another embodiment, a method is presented for detecting potential rudder induced oscillation.

The features, functions and advantages discussed above can be achieved independently in various embodiments or may be combined in yet other embodiments. Further details can be seen with reference to the following description and drawings.

BRIEF DESCRIPTION OF THE DRAWINGS

FIG. 10 are time histories of roll, pitch, and yaw for a linearized ship dynamic system in accordance with the disclosure.

FIG. 11 are time histories of roll, pitch, and yaw for a full nonlinear ship dynamic system in accordance with the disclosure.

FIG. 12 is ship motion time histories of an example experiment.

FIG. 13 is the FFT frequencies and magnitudes of motions in Win1 of FIG. 12.

FIG. 14 is the time histories and the largest eight FFT components of motions in Win1 of FIG. 12.

FIG. 15 is the time histories and the Fourier approximations of motions in Win1 of FIG. 12.

FIG. 16 is the FFT frequencies and magnitudes of motions in Win3 of FIG. 12.

FIG. 17 is the time histories and the Fourier approximations of motions in Win3 of FIG. 12.

FIG. 18 is the frequencies and magnitudes of the largest eight Fourier components of motions in Win3 of FIG. 12.

DESCRIPTION

The following text and figures set forth a detailed description of specific examples of the invention to teach those skilled in the art how to make and utilize the best mode of the invention.

Figure 1:
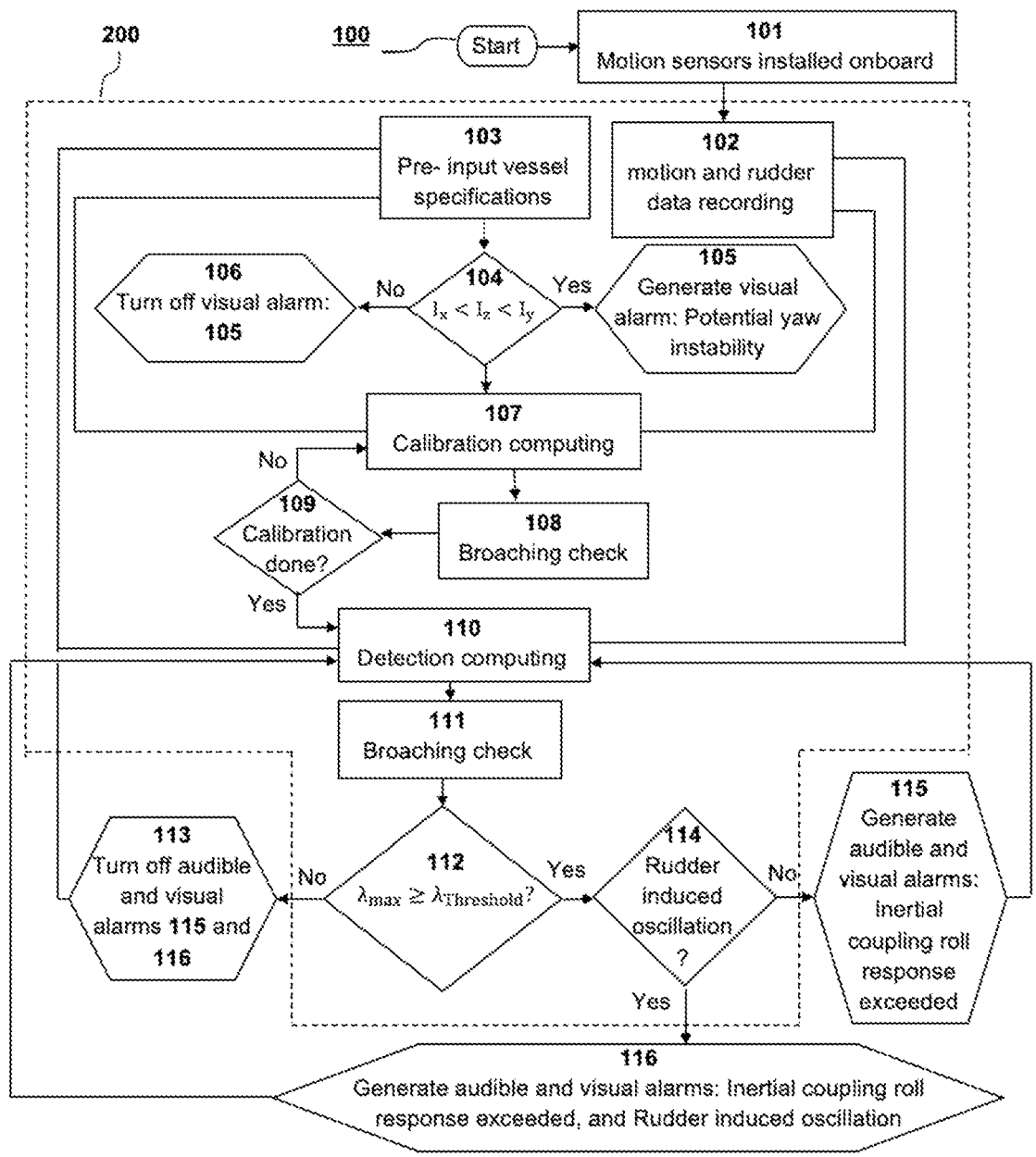
FIG. 1 is a schematic diagram of a violent motion and capsizing warning system in accordance with the disclosure.

Referring to FIG. 1, a violent motion and capsizing warning system 100 is part of or associated with the ship management computer (not shown). The system 100 includes a motion sensor module 101, a computing service module 200, and alarming device comprising 113, 115 and 116. The computing service module includes a data recording module 102, a vessel specification module 103, a yaw nonlinear instability check module 104, a visual alarming module comprising 105 and 106, a calibration module 107, a broaching check module 108, a calibration check module 109, a detection computing module 110, a broaching check module 111, a roll response coefficient exceedance check module 112, a rudder induced oscillation check module 114.

Figure 2:
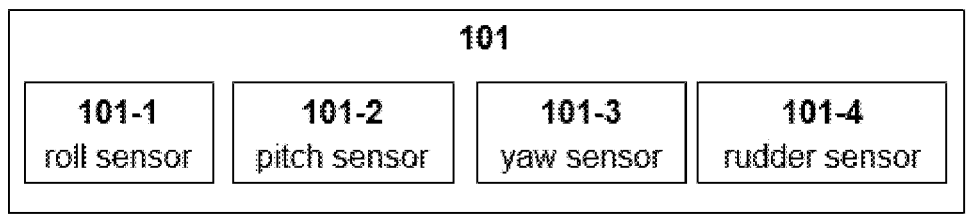
FIG. 2 is a diagram of motion sensors in accordance with the disclosure.
Figure 3:
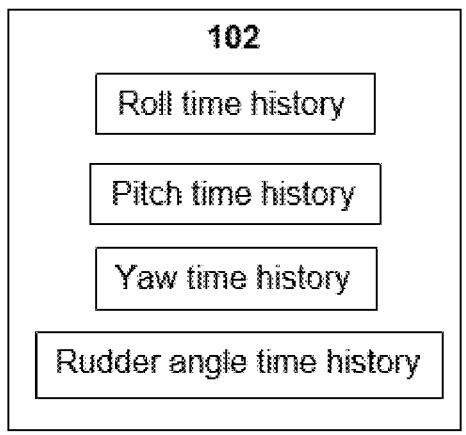
FIG. 3 is a diagram of a motion time history recording system in accordance with the disclosure.
Figure 4:
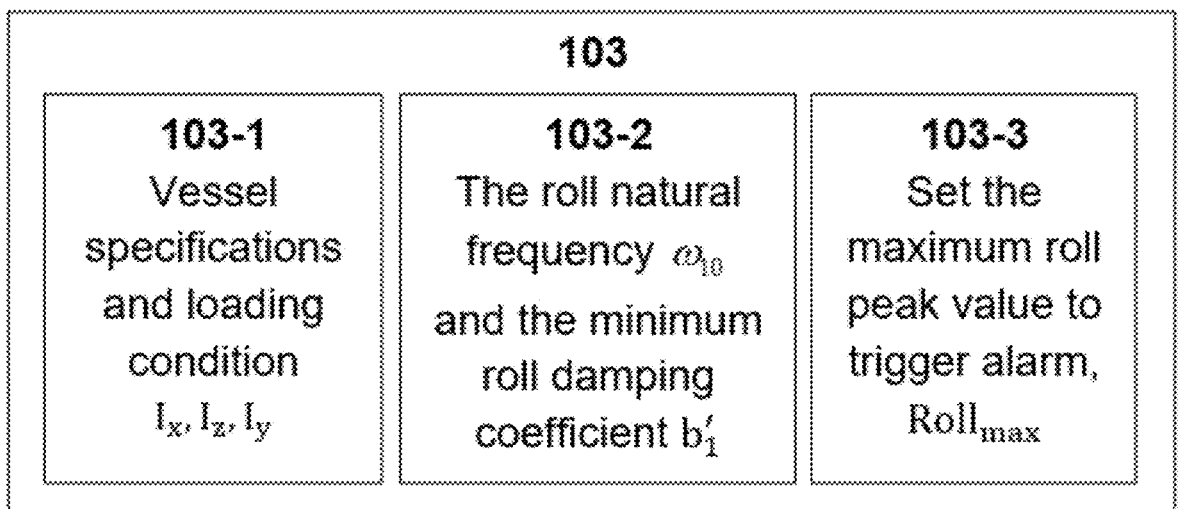
FIG. 4 is a diagram of vessel specifications in accordance with the disclosure.

Referring to FIG. 2, the motion sensor module includes at least a roll sensor 101-1, a pitch sensor 101-2, a yaw sensor 101-3, and a rudder sensor 101-4 which measure the roll, pitch, yaw, and rudder motions constantly and send the time history data to the data recording module 102 where the time history data are stored in a readable hardware as shown in FIG. 3. The vessel specification module 103 as shown in FIG. 4 includes loading condition specifications 103-1 such as moments of inertia for roll ($I_x$), pitch ($I_y$) and yaw ($I_z$), the roll characteristics 103-2 which includes the roll natural frequency u and the minimum roll damping coefficient $b'_1$, and a pre-determined value module 103-3 which is a maximum roll peak value, $Roll_{max}$ used to trigger alarm. The vessel loading specification information, $I_x,I_y,I_z$ needs to be current and as accurate as possible. The roll natural frequency needs to be consistent with the current GM condition and as accurate as possible. The minimum roll damping coefficient $b'_1$ required for the system is not the roll damping obtained in the roll decay test which is the common test for roll damping. This minimum roll damping coefficient represents the minimum value the roll damping could reach during heavy seas. In general, the minimum roll damping happens when high wave crest is amidships in a following sea such that the bow and stern of a ship are both exposed in the air. If the minimum roll damping coefficient $b'_1$ is not available, a small default value such as 10% of the roll damping obtained by a roll decay test may be used. The maximum roll peak value $Roll_{max}$ represents a tolerance level that the ship master wants to set to trigger an alarm. This value depends on the current ship righting arm curves, ship type, and the sea state the ship is going to encounter. Therefore, this value is vessel and sea state dependent. In general, this value is much smaller than the roll angle at which the ship could capsize. Preferably, $Roll_{max}$ is between 10-90% of the maximum roll to capsize a ship. The above information in 103 may be determined before the vessel leaving a port. In the check module 104 as shown in FIG. 1, the computing service 200, which may be performed by a computer installed on board or through web service, compares the moments of inertial for roll, pitch, and yaw. If the yaw moment of inertia is found to be in the middle between the roll and pitch moments of inertia, i.e. $I_x<I_z<I_y$, a visual alarm signal is generated to alert the crew for a potential yaw nonlinear instability since sharp yaw velocity in maneuver may become large enough to exceed the yaw angular velocity threshold defined in Math. 17b and the ship may lose its yaw control and experience a sudden large roll motion. As an example, if the loading condition of Ro/Ro ferry MV Sewol made the pitch moment of inertia to be the largest one among the three moments of inertia, the warning system invented will give warning to the crew for a potential yaw nonlinear instability so that the crew needs to be very careful to avoid broaching and to turn the ship very slowly to prevent capsizing.

Figure 5:
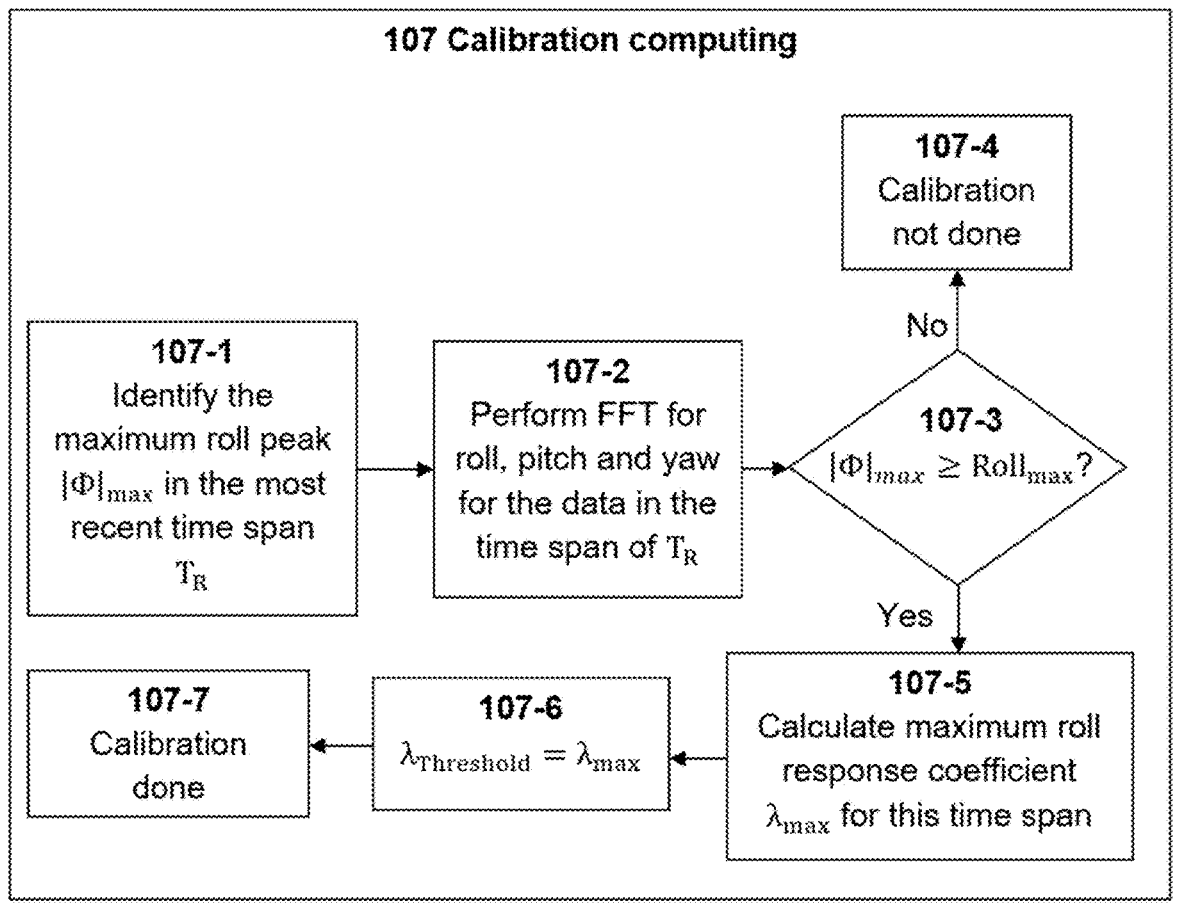
FIG. 5 is a flow chart for calculating the inertial coupling roll response coefficient threshold in accordance with the disclosure.

Referring to FIG. 1 and FIG. 5, the calibration module 107 communicates with the module 103 to get the roll natural frequency $\omega_{10}$ and communicates with the module 102 to get the time histories of motions for the most recent time span of $T_R$ which is the time duration for the FFT analyses and may be determined as $$T_R=2\pi n/\omega_{10}, n=2, 3, \ldots 10. \qquad \text{Math. 18}$$

The preferred number for n is 2, although the number could be larger such as 10 or higher. The maximum roll peak $|\Psi|_{max}$ in the most recent time span $T_R$ is identified in 107-1. The FFT analyses for the roll, pitch, and yaw data in the time span $T_R$ are performed in 107-2. Since the waveform frequency resolution for FFT analyses is proportional to $1/T_R$, Lower frequencies than this resolution are not able to be detected. To solve this resolution problem, the data in the time span could be mirrored several times to increase the data samples. Therefore, by mirroring the data we increase the time span several times as well. Then the FFT analyses is performed for the mirrored data. Fast Fourier transform is used for the finite Fourier analyses. Therefore, the number of data samples is required to be in the power of 2, for example, $2^6$ or higher. The higher the power goes the more accurate the results would be. The roll, pitch, and yaw motions are described as finite Fourier series as given in Math. 9, Math. 10, and Math. 11, respectively. The amplitudes and frequencies in Math. 9, Math. 10 and Math. 11 are obtained by the FFT analyses performed in 107-2. The roll responses due to the 2×N×N inertial coupling moments in Math. 12 can be obtained using Math. 13 and Math. 14. The number N is preferred to be 8 although it may be larger up to 20 or smaller than 8. If the maximum roll peak in this time span $T_R$ is equal to or greater than the value $Roll_{max}$ set in 103-3, i.e. $|\Phi|_{max}>Roll_{max}$ which is checked in 107-3, the maximum roll peak to trigger the alarm has been exceeded. The maximum roll response coefficient $\lambda_{max}$ defined in Math. 19 in the same time span $T_R$ is calculated in 107-5.

$$\varphi_{max} = \lambda_{max}\frac{I_z - I_y}{I_x} = \max\{2 \times N \times N \text{ roll responses}\}, \qquad \text{Math. 19}$$

wherein the 2×N×N roll responses are given in Math. 13 and Math. 14. This $\lambda_{max}$ is set to be the coefficient threshold in 107-6, i.e. $\lambda_{Threshold}=\lambda_{max}$. Then the calibration procedure is considered done in 107-7. The system continues to 108 for broaching check, to 109 for calibration check, and to 110 for detection computing. On the other hand, however, if the maximum roll peak in this time span $T_R$ is less than the value $Roll_{max}$ set in 103-3, i.e. $|\Phi|_{max}<Roll_{max}$ which is checked in 107-3, the calibration is considered not done in 107-4. Then the system continues to 108 for broaching check and to 109 for calibration check, and goes back to 107 for the next time span as shown in FIG. 1

For example, FIG. 12 shows the time histories of roll, pitch, yaw and rudder of an experiment run by Pauling J. R. etc. 1972, "Experimental studies of capsizing of intact ships in heavy seas", Technical report AD-753653, University of California, Berkeley. The data in Win1 of FIG. 12 has been extracted for FFT analyses. The roll natural frequency for this ship was found to be $\omega_{10}=0.79$. The time span $T_R$ in Win1 equals 15.9 seconds in this case. The maximum roll peak in Win1 was found to be $|\Phi|_{max}=47$ degrees. Note that the 47 degrees roll was quite large for the ship and the ship almost capsized in Win1. Let us set the $Roll_{max}$ in 103-3 to be 25 degrees for demonstration purpose. FIG. 13 shows the FFT frequencies and magnitudes of the roll, pitch, yaw, and rudder for the data in Win1 of FIG. 12. The largest eight components for each motion are identified as shown in FIG. 13. The time histories of motions and the largest eight components with the amplitudes and frequencies obtained from FFT analyses are shown in FIG. 14. The phases of these components are adjusted to best fit the original data in Win1 of FIG. 12 when the eight components are combined as shown in FIG. 15. The maximum of the 128 roll responses may be obtained in 107-5 as below for this case.

$$\lambda_{max} = \frac{A_{24}\omega_{24}A_{31}\omega_{31}}{2b'_1(\omega_{24} - \omega_{31})} = 7.12, \qquad \text{Math. 20}$$

at the frequency $\omega_{24}-\omega_{31}=0.79=\omega_{10}$. The roll damping coefficient was assumed to be 0.4% of the critical roll damping for this case. The calibration check in 107-3 says that the maximum roll peak to trigger the alarm has been exceeded, i.e. $|\Phi|_{max}$=47>Roll$_{max}$=25. Therefore, the coefficient threshold was found to be $\lambda_{Threshold}$7.12 in this case.

Figure 6:
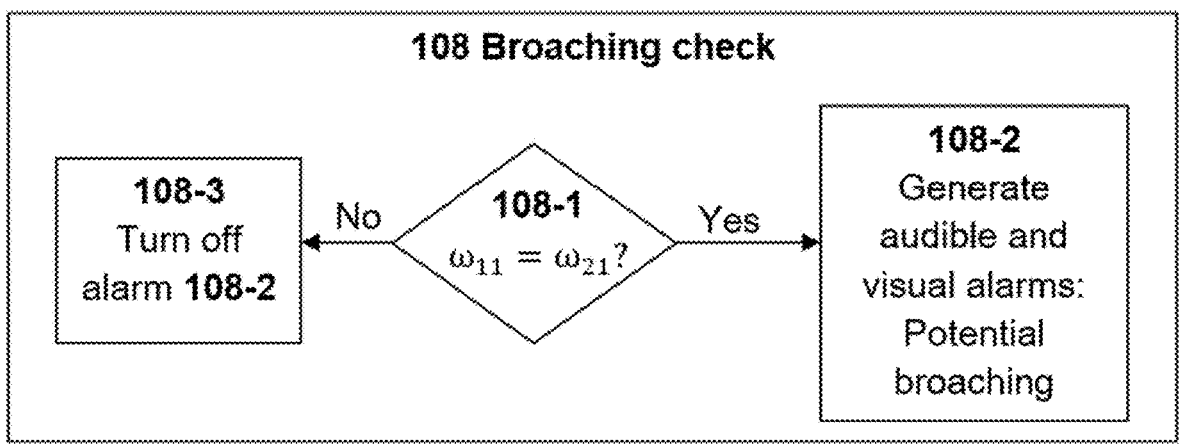
FIG. 6 is a flow chart for identifying potential broaching in calibration mode in accordance with the disclosure.

Referring to FIG. 1 and FIG. 6, the broaching check is performed in the module 108. If the frequency $\omega_{11}$ of the largest amplitude roll component obtained in 107-2 is equal to the frequency $\omega_{21}$ of the largest amplitude pitch component obtained in 107-2, a potential broaching can happen according to Math. 16. The system will generate audible and visual alarms in 108-2, saying "potential broaching". If these two frequencies do not match each other, the system goes to 108-3 and the alarm in 108-2 will be turned off if it is on.

Figure 7:
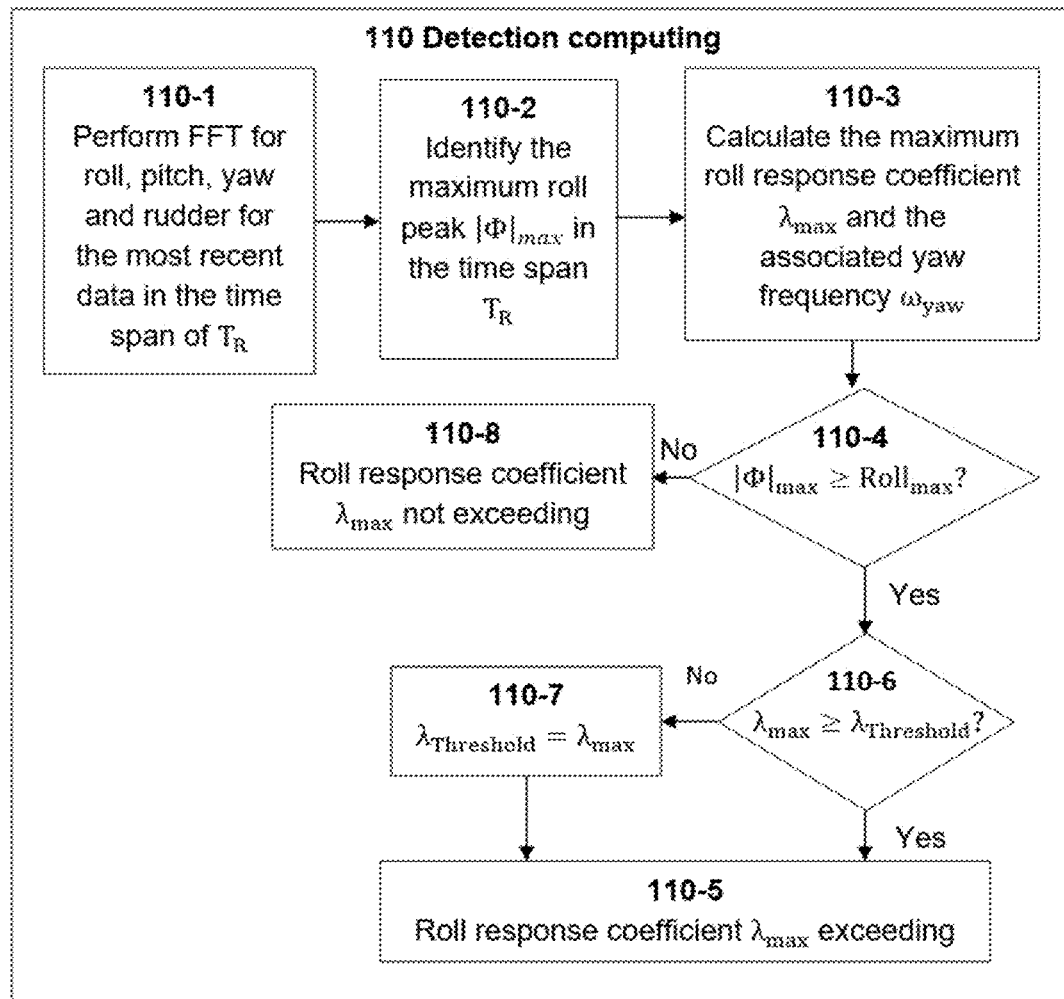
FIG. 7 is a flow chart for detecting potential violent roll or capsizing due to the inertial coupling effect in accordance with the disclosure.

Referring to FIG. 1 and FIG. 7, the detection computing module 110 communicates with the module 103 to get the roll natural frequency $\omega_{10}$ and communicates with the module 102 to get the time histories of motions for the most recent time span of $T_R$ which is the time duration for the FFT analyses. $T_R$ is determined by Math. 18. The preferred number for n is 2, although the number could be larger such as 10 or higher. The FFT analyses for the roll, pitch, yaw, and rudder data in the time span $T_R$ are performed in 110-1. The roll, pitch, and yaw motions can be described as finite Fourier series as given in Math. 9, Math. 10, and Math. 11, respectively. The amplitudes and frequencies in Math. 9, Math. 10, and Math. 11 are obtained by the FFT analyses performed in 110-1, respectively. The rudder motion can be also described as finite Fourier series as given in Math. 21 with the amplitudes and frequencies obtained in 110-1.

$$\eta = \Sigma_{m=1}^{N} \cos(\omega_{4m}t + \beta_{4m}) + \eta_{40}, \qquad \text{Math. 21}$$

wherein N is the total number of terms of the Fourier series; m is the index number for the Fourier series; $A_{4m}$ is the amplitude of the mth mode of the Fourier series; $\omega_{4m}$ and $\beta_{4m}$ are the frequency and the phase of the mth mode of the Fourier series, respectively; $\eta_{40}$ is the average value of the rudder motion.

The maximum roll peak $|\Phi|_{max}$ in the time span $T_R$ is identified in 110-2. The roll responses due to the 2×N×N inertial coupling moments in Math. 12 can be obtained using Math. 13 and Math. 14. The number N is preferred to be 8 although it may be larger up to 20 or smaller than 8. The maximum roll response coefficient $A_{max}$ defined in Math. 19 in the time span $T_R$ is calculated in 110-3. The associated yaw frequency $\omega_{yaw}$ obtained also in 110-3 is defined as the yaw frequency associated with the inertial coupling moment which generates the maximum roll response coefficient $A_{max}$ obtained in 110-3. If the maximum roll peak is greater than the value Roll$_{max}$ set in 103-3, i.e. $|\Phi|_{max}$>Roll$_{max}$ which is checked in 110-4, the maximum roll peak to trigger the alarm has been exceeded. The system goes to 110-6 to further check whether the maximum roll response coefficient $\lambda_{max}$ obtained in 110-3 exceeds the coefficient threshold $\lambda_{Threshold}$ obtained in 107-6. If $\lambda_{max}$>$\lambda_{Threshold}$ the system goes to 110-5 indicating the roll response coefficient $\lambda_{max}$ exceeding. If $\lambda_{max}$<$\lambda_{Threshold}$ it means that the coefficient threshold $\lambda_{Threshold}$ obtained in 107-6 is too high and needs to be updated by the value obtained in 110-3. This update is performed in 110-7. Then the system goes to 110-5 indicating the roll response coefficient $\lambda_{max}$ exceeding. On the other hand, if the maximum roll peak is less than the value Roll$_{max}$ set in 103-3, i.e. $|\Phi|_{max}$<Roll$_{max}$, the system goes to 110-8 indicating the roll response coefficient $\lambda_{max}$ not exceeding.

For example, in the demonstration case in FIG. 12 the coefficient threshold $\lambda_{Threshold}$ was found to be 7.12 as shown in Math. 20 based on the data in Win1 of FIG. 12. Similarly, FFT analyses are performed for Win2 which is a successive time span to Win1 in FIG. 12. Based on the same procedure as above, the maximum roll peak in Win2 is found to be $|\Phi|_{max}$=28 degrees which is larger than the preset Roll$_{max}$=25 degrees in 103-3. According to detection computing 110, the system goes to 110-6 in FIG. 7. The maximum roll response coefficient $\lambda_{max}$ is found to be 3.56 in 110-3. In this case, 110-6 check in FIG. 7 shows negative. Therefore, the coefficient threshold needs to be updated, i.e., $\lambda_{Threshold}$=156 which is the new coefficient threshold. From now on, the detection computing 110 will use the new coefficient threshold for future detection until its next update. The system checks broaching in 111 (explained in FIG. 8 below) in FIG. 1 and it shows negative for Win2. Since $|\Phi|_{max}$=28>Roll$_{max}$=25, 112 roll response coefficient check in FIG. 1 is positive in this case. Then the rudder induced oscillation is checked in 114 and it shows also negative for this case of Win2. Therefore, only alarm 115 is triggered in this case.

Figure 8:
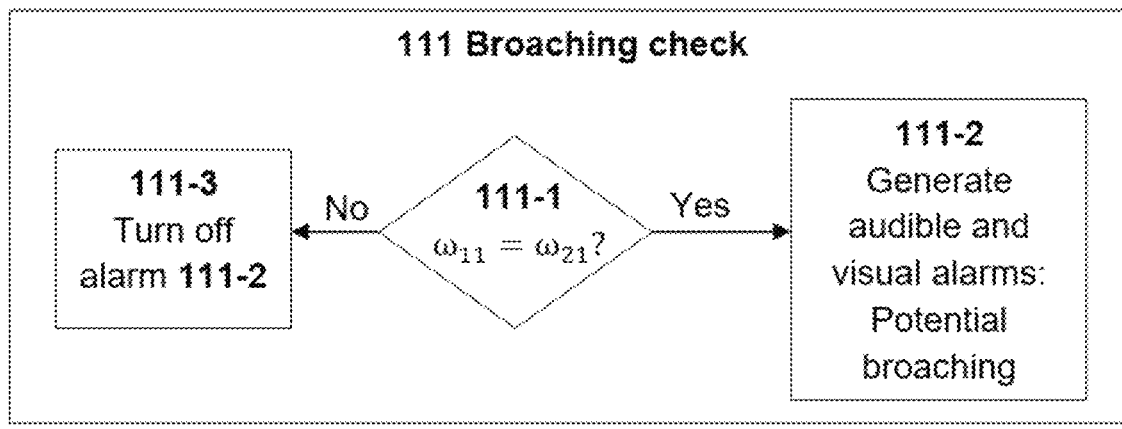
FIG. 8 is a flow chart for identifying potential broaching in detecting mode in accordance with the disclosure.

Referring to FIG. 1 and FIG. 8, after detection computing 110 finished, the system goes to broaching check at 111. If the frequency $\omega_{11}$ of the largest roll component amplitude obtained in 110-1 is equal to the frequency $\omega_{21}$ of the largest pitch component amplitude obtained in 110-1, a potential broaching may happen according to Math. 16. The system will generate audible and visual alarms in 111-2, saying "potential broaching". If these two frequencies do not match each other, the system goes to 111-3 and the alarm in 111-2 will be turned off if it is on. This completes the broaching check.

Figure 9:
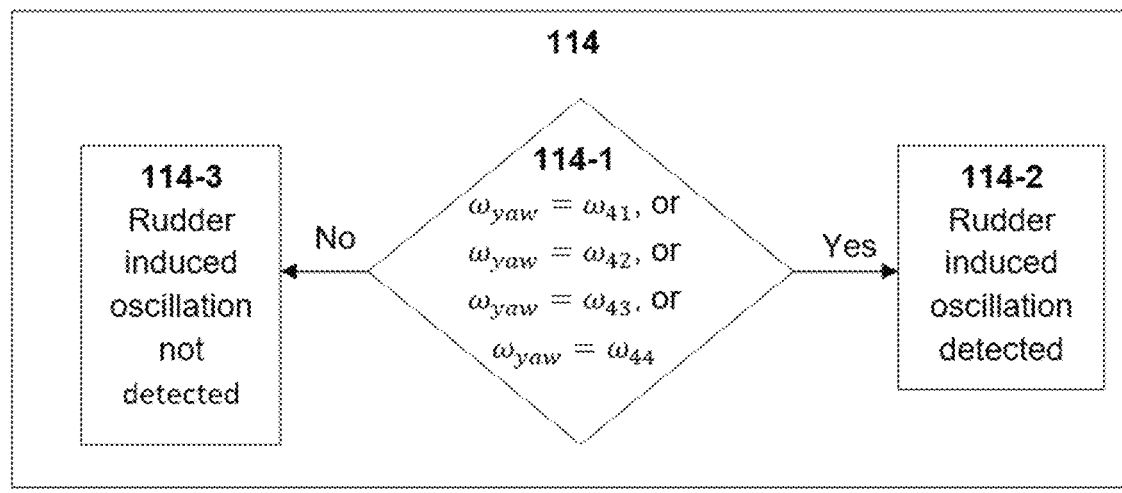
FIG. 9 is a flow chart for identifying potential rudder induced oscillation in accordance with the disclosure.

Referring to FIG. 1 and FIG. 9, after the broaching check 111, the system goes to 112 to check again the roll response coefficient exceedance. 112 is to confirm the previous conclusion obtained in detection computing 110. If the roll response coefficient $\lambda_{max}$ exceeding is true, the system goes to 114 to further check rudder induced oscillation as shown in FIG. 9. If the associated yaw frequency $\omega_{yaw}$ is equal to anyone of the frequencies of the largest four rudder components as shown in 114-1 in FIG. 9, the associated yaw frequency $\omega_{yaw}$ may be driven by that rudder frequency, indicating that the inertial coupling excited roll oscillation is driven indirectly by rudder. Therefore, the roll oscillation can be considered as rudder induced oscillation. If this is true, a rudder induced oscillation is detected in 114-2. The system goes to 116 in FIG. 1 to generate audible and visual alarms indicating "inertial coupling roll response exceeded, and rudder induced oscillation at frequency $\omega_{yaw}$". The system then goes back to detection computing 110 to start the next cycle of detecting. If the roll response coefficient $\lambda_{max}$ exceeding in 112 is true, but no rudder induced oscillation is detected, the system goes to 115 to generate audible and visual alarms indicating "inertial coupling roll response exceeded". Then the system goes back to detection computing 110 to start the next cycle of detecting. If the roll response coefficient $\lambda_{max}$ is not exceeding the threshold in 112, the system goes to 113 to turn off the alarms generated in 115 or 116 whichever is on. Then the system goes back to detection computing 110 to start the next cycle of detection. The system is running continuously without stop until the system is turned off manually.

For example, in the demonstration case in FIG. 12 the new coefficient threshold was found to be $\lambda_{Threshold}$=3.56 after the detection computing for Win2 in FIG. 12. We have performed detection computing 110 for Win3 in FIG. 12. FIG. 16 shows the FFT frequencies and magnitudes of the roll, pitch, yaw, and rudder for the data in Win3 of FIG. 12. The largest eight components for each motion are identified as shown in FIG. 16. The time histories of motions in Win3 of FIG. 12 and the combined results of the Fourier approximations using the largest eight components for each motion are shown in FIG. 17. The frequencies and amplitudes of the largest eight finite Fourier components for Win3 in FIG. 12 are summarized in FIG. 18. The maximum roll peak was found in 110-2 to be $|\Phi|_{max}=45$ degrees. The maximum of the 128 roll responses has been obtained in 110-3 for this case as below.

$$\lambda_{max} = \frac{0.54 A_{24}\omega_{24}A_{36}\omega_{36}}{b'_1(\omega_{24}-\omega_{36})} = 9.18, \qquad \text{Math. 22}$$

at the frequency $\omega_{24}-\omega_{36}=0.79=\omega_{10}$. Since the $\text{Roll}_{max}=25$ degrees and $\lambda_{Threshold}=3.56$, 110-4 and 110-6 checks are both positive. The roll response coefficient $\lambda_{max}$ is exceeding, i.e. $\lambda_{max}=9.18>\lambda_{Threshold}3.56$. Since $\omega_{11}=\omega_{21}=1.38$ as shown in FIG. 18, the broaching alarm 111-2 is triggered. The yaw frequency $\omega_{36}$ involved with the inertial coupling to generate the maximum roll response coefficient as shown in Math. 22 is the associated yaw frequency, i.e. $\omega_{yaw}=\omega_{36}$. Since FIG. 18 shows that the yaw frequency $\omega_{yaw}=\omega_{36}$ coincides with the first rudder frequency $\omega_{41}1.18$, 114-1 check is positive. The rudder induced oscillation is detected in this case and the alarm 116 is triggered. Note that in Win3 of FIG. 12, the three alarms, i.e. broaching alarm 111-2, roll response coefficient exceeding alarm 116, and rudder induced oscillation alarm 116 are all triggered in this case. This is a dangerous situation for the ship to encounter. The time span of Win2 is from 201.375 to 217.25 and the time span of Win3 is from 330.25 to 346.125 seconds. As shown in FIG. 12, the ship capsized at 348.4 seconds, just 2 seconds after Win3. Note that the maximum roll response coefficient $\lambda_{max}=9.18$ in Win3 is about 2.5 times larger than the threshold value detected at Win2. If the ship can follow the warning detected in Win2 by the system to keep the inertial coupling roll response level low and to avoid broaching and rudder induced oscillation in an earlier time, the ship could prevent capsizing.

It should be understood that the above descriptions may be implemented to many types of ships, for example, such as oil tankers, bulk carriers, containerships, fishing vessels, Ro/Ro ships, boats, military ships, vessels in lakes or some other appropriate type of vessels. It should also be understood that the detailed descriptions and specific examples, while indicating the preferred embodiment, are intended for purposes of illustration only and it should be understood that it may be embodied in a large variety of forms different from the one specifically shown and described without departing from the scope and spirit of the invention. It should be also understood that the invention is not limited to the specific features shown, but that the means and construction herein disclosed comprise a preferred form of putting the invention into effect, and the invention therefore claimed in any of its forms of modifications within the legitimate and valid scope of the appended claims.

What is claimed is:
1. A warning system comprising:
   at least one motion sensor mounted on a moving oceangoing vessel and configured to collect roll, pitch, and yaw motion data of the said moving oceangoing vessel;
   at least one rudder sensor mounted on the said moving oceangoing vessel and configured to collect rudder movement data of the said moving oceangoing vessel;
   a data recorder comprising:
   a data storage configured to store time histories of the said motion data of the said vessel and specification of the said vessel;
   a computer software programmed to perform Finite Fourier Transform analyses by FFT (Fast Fourier Transform) for the said time histories of motion data, wherein said FFT analyses uses a time span $T_R$ given as

$T_R = 2\pi n/\omega_{10}$, $n=2, 3, \ldots 10$, wherein $\omega_{10}$ is the roll natural frequency of the said vessel;
   means for identifying a potential yaw nonlinear instability of the said vessel and producing a warning signal responsive to the condition $I_x<I_z<I_y$, wherein $I_x$ is a moment of inertia of the vessel about a principal X axis which runs from a stern of the vessel to a bow of the vessel, wherein $I_y$ is a moment of inertia of the vessel about a principal Y axis which runs from a starboard of a vessel to a port of the vessel, and wherein $I_z$ is a moment of inertia of the vessel about a principal Z axis which runs from a bottom of the vessel to a top of the vessel;
   means for triggering a roll response coefficient exceedance alarm, said roll response coefficient exceedance alarm being triggered when a predetermined $\text{Roll}_{max}$ is exceeded, said $\text{Roll}_{max}$ being in the range of 10% to 90% of a maximum roll for the said vessel to capsize;
   means for calculating a maximum roll response coefficient $\lambda_{max}$ using the following equation:

$$\lambda_{max} = \max\left\{ \begin{array}{l} \dfrac{A_{2j}\omega_{2j}A_{3l}\omega_{3l}}{2\sqrt{[(\omega_{2j}-\omega_{3l})^2-\omega_{10}^2]^2 + [b'_1(\omega_{2j}+\omega_{3l})]^2}}, \quad j=1,2,\ldots N; l=1,2,\ldots N; \\[2ex] \dfrac{A_{2j}\omega_{2j}A_{3l}\omega_{3l}}{2\sqrt{[(\omega_{2j}-\omega_{3l})^2-\omega_{10}^2]^2 + [b'_1(\omega_{2j}-\omega_{3l})]^2}}, \quad j=1,2,\ldots N; l=1,2,\ldots N; \end{array} \right\},$$

wherein $A_{2j}$ and $\omega_{2j}$ are the said Finite Fourier Transform amplitudes and frequencies of the jth mode of the pitch motion data, respectively, wherein $A_{3l}$ and $\omega_{3l}$ are the Finite Fourier Transform amplitudes and frequencies of the lth mode of the yaw motion data, respectively, wherein $\omega_{10}$ is the roll natural frequency of the said vessel, wherein $b'_1$ is a minimum roll damping for calculating roll response coefficients and is in the range of 0.1% to 10% of a critical roll damping, wherein N is the total number of modes in the said Finite Fourier Transform;
   means for calculating an associated yaw frequency $\omega_{yaw}$ defined as the yaw frequency associated with the inertial coupling moment which generates the said maximum roll response coefficient $\lambda_{max}$;
   means for calibration computing for a roll response coefficient threshold $\lambda_{Threshold}$ for the said oceangoing vessel, wherein $\lambda_{Threshold}$ is defined to be equal to the said maximum roll response coefficient $\lambda_{max}$ when a maximum roll peak $|\Phi|_{max}$ exceedance, i.e. $|\Phi|_{max} \geq \text{Roll}_{max}$, happens the first time in a calibration module, wherein $|\Phi|_{max}$ is defined as the maximum roll peak amplitude in the most recent said time span $T_R$ during calibration computing, and wherein $\lambda_{Threshold}$ will also be updated continuously in a detection computing module;

means for detecting roll response coefficient exceedance, i.e. whether or not $\lambda_m \geq \lambda_{Threshold}$, for the said oceangoing vessel and producing a warning signal in response thereto;

means for detecting a potential broaching for the said oceangoing vessel and producing a warning signal responsive to the condition $\omega_{11}=\omega_{21}$, wherein $\omega_{11}$ is the frequency of the $1^{st}$ mode in the said Finite Fourier Transform for the said roll motion data, wherein $\omega_{21}$ is the frequency of the $1^{st}$ mode in the said Finite Fourier Transform for the said pitch motion data;

means for detecting a rudder induced oscillation for the said oceangoing vessel and producing a warning signal responsive to the condition $\omega_{yaw}=\omega_{41}$ or $\omega_{yaw}=\omega_{42}$ or $\omega_{yaw}=\omega_{43}$ or $\omega_{yaw}=\omega_{44}$, wherein $\omega_{41}$, $\omega_{42}$, $\omega_{43}$, and $\omega_{44}$ are the frequencies of the $1^{st}$, the $2^{nd}$, the $3^{rd}$, and the $4^{th}$ modes in the said Finite Fourier Transform for the said rudder movement data, respectively.

2. The system of claim 1 wherein the said at least one motion sensor for roll, pitch, and yaw motion data collection comprises a plurality of sensors.

3. The system of claim 1 wherein the said data storage is installed on board the said vessel.

4. The system of claim 1 wherein the said data storage is installed remotely in other places other than the said vessel.

5. The system of claim 1 wherein the said software is installed in an onboard computer.

6. The system of claim 1 wherein the said software is installed remotely and the Finite Fourier Transform analyses by FFT are performed through web service.

7. The system of claim 1 wherein at least one of the said warning signals comprises visual and audible alarms.

* * * * *

UNITED STATES PATENT AND TRADEMARK OFFICE
CERTIFICATE OF CORRECTION

PATENT NO. : 10,822,062 B2  
APPLICATION NO. : 16/159569  
DATED : November 3, 2020  
INVENTOR(S) : Shaojie Tang It is certified that error appears in the above-identified patent and that said Letters Patent is hereby corrected as shown below:

In the Specification

BACKGROUND: Column 1, Line 49, "$\vec{M} = (M_x, M_y, M_z:$" to read as "$\vec{M} = (M_x, M_y, M_z):$".

BACKGROUND: Column 2, Line 5, "V is" to read as "$\vec{V}$ is".

BACKGROUND: Column 2, Line 18, "(V)" to read as "$(\vec{V})$".

BACKGROUND: Column 2, Line 62, Math. 7, "$b_2 + \dot{\theta}$" to read as "$b_2 \dot{\theta}$".

BACKGROUND: Column 3, Line 15, "$-\vec{\omega}\lambda\vec{H}$" to read as "$-\vec{\omega} \times \vec{H}$".

BACKGROUND: Column 3, Line 21, Math. 9, "$A_{1i} \cos(\omega_1 t + \beta_{1i} + \varphi_0$" to read as "$A_{1i} \cos(\omega_1 t + \beta_{1i}) + \varphi_0$".

BACKGROUND: Column 3, Line 30, Math. 10, "$A_{2j} \cos(\omega_2 t + \beta_{2j} + \theta_0$" to read as "$A_{2j} \cos(\omega_2 t + \beta_{2j}) + \theta_0$".

BACKGROUND: Column 3, Line 33, Math. 11, "$A_{3l} \cos(\omega_3 t + \beta_{3l} + \psi_0$" to read as "$A_{3l} \cos(\omega_3 t + \beta_{3l}) + \psi_0$".

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,822,062 B2

BACKGROUND: Column 3, Line 39, "$\Phi_0$" to read as "$\varphi_0$".

BACKGROUND: Column 3, Line 54, Math. 12, "$-\cos[(\omega_{2j} - \omega_{3l}t + \beta_{2j} - \beta_{3l}]$" to read as "$-\cos[(\omega_{2j} - \omega_{3l})t + \beta_{2j} - \beta_{3l}]$".

BACKGROUND: Column 5, Line 4, "$\sqrt{\omega_{21}^2 - \omega_{20}^2 + (b_2'\omega_{21})^2}/\omega_{21}$" to read as "$\sqrt{(\omega_{21}^2 - \omega_{20}^2)^2 + (b_2'\omega_{21})^2}/\omega_{21}$".

DESCRIPTION: Column 7, Line 6, "frequency u" to read as "frequency $\omega_{10}$".

DESCRIPTION: Column 7, Line 60, "$|\Psi|_{max}$" to read as "$|\Phi|_{max}$".

DESCRIPTION: Column 9, Line 4, "$\lambda_{Threshold}7.12$" to read as "$\lambda_{Threshold} = 7.12$".

DESCRIPTION: Column 9, Line 31, Math. 21, "$\sum_{m=1}^{N} \cos(\omega_{4m}t + \beta_{4m})$" to read as "$\sum_{m=1}^{N} A_{4m} \cos(\omega_{4m}t + \beta_{4m})$".

DESCRIPTION: Column 9, Line 43, "$A_{max}$" to read as "$\lambda_{max}$".

DESCRIPTION: Column 9, Line 47, "$A_{max}$" to read as "$\lambda_{max}$".

DESCRIPTION: Column 9, Line 54, "$\lambda_{max} > \lambda_{Threshold}$" to read as "$\lambda_{max} \geq \lambda_{Threshold}$".

DESCRIPTION: Column 10, Line 9, "$\lambda_{Threshold} = 156$" to read as "$\lambda_{Threshold} = 3.56$".

DESCRIPTION: Column 11, Line 11, Math. 22, "$\frac{0.54 A_{24}\omega_{24} A_{36}\omega_{36}}{b_1'(\omega_{24}-\omega_{36})}$" to read as "$\frac{0.5 A_{24}\omega_{24} A_{36}\omega_{36}}{b_1'(\omega_{24}-\omega_{36})}$".

DESCRIPTION: Column 11, Line 18, "$\lambda_{Threshold}3.56$" to read as "$\lambda_{Threshold}=3.56$".

DESCRIPTION: Column 11, Line 24, "$\omega_{41}1.18$" to read as "$\omega_{41} = 1.18$".

In the Claims

Column 12, Line 35, "$2\sqrt{\left[(\omega_{2j} - \omega_{3l})^2 - \omega_{10}^2\right]^2 + \left[b_1'(\omega_{2j} + \omega_{3l})\right]^2}$" to read as "$2\sqrt{\left[(\omega_{2j} + \omega_{3l})^2 - \omega_{10}^2\right]^2 + \left[b_1'(\omega_{2j} + \omega_{3l})\right]^2}$".

Column 13, Line 4, "$\lambda_m \geq \lambda_{Threshold}$" to read as "$\lambda_{max} \geq \lambda_{Threshold}$".